(12) United States Patent
Kataoka et al.

(10) Patent No.: US 8,508,702 B2
(45) Date of Patent: Aug. 13, 2013

(54) LIQUID CRYSTAL DISPLAY DEVICE

(75) Inventors: Shingo Kataoka, Tokyo (JP); Yoshio Koike, Kanagawa (JP)

(73) Assignee: Sharp Kabushiki Kaisha, Osaka (JP)

( * ) Notice: Subject to any disclaimer, the term of this patent is extended or adjusted under 35 U.S.C. 154(b) by 478 days.

(21) Appl. No.: 11/254,557

(22) Filed: Oct. 20, 2005
(Under 37 CFR 1.47)

(65) Prior Publication Data

US 2006/0250556 A1 Nov. 9, 2006

(30) Foreign Application Priority Data

Nov. 12, 2004 (JP) .................................. 2004-328429

(51) Int. Cl.
*G02F 1/1337* (2006.01)
(52) U.S. Cl.
USPC .......................................... 349/129; 349/123
(58) Field of Classification Search
USPC ..................... 349/129, 144, 123; 252/299.01
See application file for complete search history.

(56) References Cited

U.S. PATENT DOCUMENTS

| | | | |
|---|---|---|---|
| 6,903,796 B2 | 6/2005 | Kataoka | |
| 7,248,318 B2 | 7/2007 | Nakamura et al. | |
| 7,262,824 B2 | 8/2007 | Sasabayashi et al. | |
| 7,286,200 B2 | 10/2007 | Inoue et al. | |
| 7,289,178 B2 | 10/2007 | Sasabayashi et al. | |
| 2002/0021401 A1* | 2/2002 | Kataoka | 349/178 |
| 2003/0058374 A1 | 3/2003 | Takeda et al. | |
| 2003/0059724 A1* | 3/2003 | Choi | 430/321 |
| 2003/0095223 A1* | 5/2003 | Song | 349/141 |
| 2003/0095229 A1* | 5/2003 | Inoue et al. | 349/187 |
| 2003/0123005 A1* | 7/2003 | Liu et al. | 349/129 |

(Continued)

FOREIGN PATENT DOCUMENTS

| | | |
|---|---|---|
| CN | 1332386 | 1/2002 |
| CN | 1462898 | 12/2003 |
| JP | 6-347795 | 12/1994 |
| JP | 2003-156731 | 5/2003 |
| JP | 2003177408 A * | 6/2003 |
| JP | 2004-004329 | 1/2004 |

(Continued)

OTHER PUBLICATIONS

Japanese Office Action mailed Apr. 20, 2010, and issued in corresponding Japanese Application No. 2004-328429.

*Primary Examiner* — Jessica M Merlin
(74) *Attorney, Agent, or Firm* — Greer Burns & Crain, Ltd.

(57) ABSTRACT

This liquid crystal display device comprises electrodes that are formed on at least one of a pair of substrates, and are used for applying voltage onto liquid crystal molecules; a first alignment control layer that is sandwiched between the substrates, and makes the liquid crystal molecules aligned vertically; a liquid crystal layer formed by sandwiching a liquid crystal composition comprising a liquid crystal and a photopolymerizable compound between the substrates, followed by ultraviolet ray irradiation; and a second alignment control layer composed of a UV-cured product formed by the ultraviolet ray irradiation that is formed so that not less than two domains having different threshold voltages are present in a pixel, and at least one of the domains has a threshold voltage higher than the threshold voltage by the first alignment control layer. Liquid crystal display devices having good halftone viewing angle characteristics are provided.

21 Claims, 27 Drawing Sheets

(56) References Cited

U.S. PATENT DOCUMENTS

| | | |
|---|---|---|
| 2003/0231272 A1 | 12/2003 | Nakamura et al. |
| 2004/0027524 A1* | 2/2004 | Shiota et al. .................. 349/129 |
| 2004/0233349 A1* | 11/2004 | Shibuya et al. ................. 349/88 |
| 2004/0233365 A1* | 11/2004 | Yoshida et al. ............... 349/123 |
| 2004/0246423 A1* | 12/2004 | Sasabayashi et al. ......... 349/130 |
| 2005/0030458 A1* | 2/2005 | Sasabayashi et al. ......... 349/129 |
| 2005/0128371 A1 | 6/2005 | Ueda et al. |
| 2005/0162585 A1* | 7/2005 | Komitov et al. ................ 349/88 |
| 2006/0066793 A1* | 3/2006 | Ohmuro et al. ............... 349/129 |
| 2006/0087605 A1* | 4/2006 | Sasabayashi et al. ......... 349/127 |
| 2006/0109406 A1 | 5/2006 | Sasabayashi et al. |
| 2006/0125970 A1 | 6/2006 | Inoue et al. |
| 2007/0206129 A1 | 9/2007 | Nakamura et al. |

FOREIGN PATENT DOCUMENTS

| | | |
|---|---|---|
| JP | 2004-301979 | 10/2004 |
| JP | 2004-302291 | 10/2004 |
| JP | 2004302224 A * | 10/2004 |
| JP | 2004-318077 | 11/2004 |
| JP | 2004318077 A * | 11/2004 |

* cited by examiner

A slight drift of several μm in the alignment of a mask will result in different half-tone viewing angle characteristics between the right and left parts.

(I)

(II)

(III)

LIQUID CRYSTAL DISPLAY DEVICE

CROSS-REFERENCE TO RELATED APPLICATIONS

This application is based upon and claims the benefit of priority from the prior Japanese Patent Application No. 2004-328429, filed on Nov. 12, 2004, the entire contents of which are incorporated herein by reference.

BACKGROUND OF THE INVENTION

1. Field of the Invention

The present invention relates to a liquid crystal display device having improved half-tone viewing angle characteristics. More particularly, the present invention relates to a vertical alignment liquid crystal display device with an improved half-tone viewing angle characteristics such as an MVA (Multi-domain Vertical Alignment) mode liquid crystal display device.

2. Description of the Related Art

For liquid crystal displays (LCDs) using active matrices, TN mode liquid crystal display devices have been widely used in which a liquid crystal material having a positive dielectric constant anisotropy is aligned horizontally to the substrate surface, in a manner twisted at an angle of 90° between two substrates opposite to each other. However, this TN mode has a problem of low viewing angle characteristics. Accordingly, various studies are being carried out to improve the viewing angle characteristics.

As an alternative mode, the MVA mode has been developed in which a liquid crystal material having a negative dielectric constant anisotropy is vertically aligned, and the tilting directions of the liquid crystal molecules at voltage application are regulated by protrusions and openings (slits) formed on the substrate surface. It has improved the viewing angle characteristics greatly.

An MVA mode liquid crystal display device is explained, using FIGS. 1A, 1B and 2. FIGS. 1A and 1B are conceptual views showing an MVA mode liquid crystal display device. FIG. 2 is a conceptual view showing alignment directions of liquid crystal molecules in the MVA mode liquid crystal display device.

In an MVA mode liquid crystal display device, liquid crystal molecules having a negative dielectric constant anisotropy are vertically aligned between two glass substrates. A pixel electrode connected to TFTs is formed on one of the glass substrates, and a counter electrode is formed on the other glass substrate. Protrusions 8 are formed respectively on the pixel electrode and counter electrode, in an alternate manner.

When a TFT is OFF, liquid crystal molecules 4 are aligned in a direction vertical to the interface of the substrate 1 as shown in FIG. 1A. When the TFT is ON, an electric field is applied to the liquid crystal and the tilting directions of the liquid crystal molecules 4 are regulated by the configuration of protrusions 8. By this, the liquid crystal molecules 4 are aligned in a plurality of directions in a pixel, as shown in FIG. 1B. For example, when the protrusions 8 are formed as shown in FIG. 2, the liquid crystal molecules are aligned in the directions A, B, C and D, respectively. Since the liquid crystal molecules are aligned in a plurality of directions as shown above in an MVA mode liquid crystal display device when a TFT is in a state of ON, good viewing angle characteristics are realized.

In the above-described MVA mode, it is not that alignment control films control the tilting directions of the liquid crystal molecules, and therefore, it is not necessary to apply an alignment treating process, represented by a rubbing process, which has been almost inevitably necessary in a horizontal alignment mode represented by the TN mode. Accordingly, in view of the processing, problems related to static electricity and debris due to rubbing are avoided, and washing steps after the alignment treating process is unnecessary. Furthermore, in view of the alignment, there are advantages that the problem of display irregularities due to the fluctuation in pretilting is absent, the process is simpler, the production yield is improved, and a low cost is realized.

In addition, as a technology for regulating the alignment of liquid crystal molecules, a liquid crystal display device is also known that has a first alignment control layer and a second alignment control layer formed by polymerizing a polymer precursor, between the substrates and sandwiching a liquid crystal layer (see Japanese Patent No. 3520376, claims).

However, there are some big problems to be solved also in the MVA mode liquid crystal display devices. One of them is that, as shown in FIG. 3, there are a half-tone region in which the transmittance in the transmittance-voltage characteristics (T-V characteristics) in a state of a polar angle of 60° and an angle of direction of 45° to the tilting direction of a liquid crystal molecule is higher than the transmittance in the T-V characteristics in the direction facing the tilting direction of the liquid crystal molecule (that is, a polar angle of 0°), and another half-tone region in which the relation is that the former is lower than the latter, and accordingly, the color tones at the front and the color tones when seen diagonally are sometimes different from each other. It is to be noted that the relationship of the polar angle and the angle of direction relative to the tilting direction of a liquid crystal molecule is schematically shown in the lower part of FIG. 3.

SUMMARY OF THE INVENTION

One object of the present invention is to solve such a problem, and realize good half-tone viewing angle characteristics. Other objects and advantages of the invention will become apparent from the following explanations.

According to one aspect of the present invention, provided is a liquid crystal display device comprising: electrodes that are formed on at least one of a pair of substrates, and are used for applying voltage onto liquid crystal molecules; a first alignment control layer that is sandwiched between the substrates, and makes the liquid crystal molecules aligned vertically; a liquid crystal layer formed by sandwiching a liquid crystal composition comprising a liquid crystal and a photo-polymerizable compound between the substrates, followed by ultraviolet ray irradiation; and a second alignment control layer composed of a UV-cured product formed by the ultraviolet ray irradiation that is formed so that not less than two domains having different threshold voltages are present in a pixel, and at least one of the domains has a threshold voltage higher than the threshold voltage by the first alignment control layer.

By this aspect of the present invention, it is possible to realize a liquid crystal display device having good half-tone viewing angle characteristics.

Preferable are that the mutual border between the domains is approximately in parallel with the tilting direction of the liquid crystal molecules; that protrusions formed on a substrate or slits in an electrode makes the mutual border between the domains; that the difference between the maximum value and the minimum value of the above-described different threshold voltages is not less than 0.3 V; that two domains having the above-described different threshold voltages are formed in a pixel, and the divisional ratio of the domain having the lower threshold voltage: the domain having the higher threshold voltage in a pixel is in the range of 2:8 to 8:2; that the photopolymerizable compound has a ring structure; that the photopolymerizable compound comprises a bifunctional photopolymerizable compound represented by the following formula (1),

α-Y-A-X—B—Z-α    (1)

(wherein A and B are, independently from each other, a ring group; α's are, independently from each other, an acrylate group or a methacrylate group; and X, Y and Z are, independently from each other, a group or direct bond to bind the groups);
that the photopolymerizable compound comprises two types: a bifunctional photopolymerizable compound according to formula (1) wherein X is a direct bond, and a bifunctional photopolymerizable compound according to formula (1) wherein X is not a direct bond; that, in formula (1), Y and Z are, independently from each other, represented by the following formula (2),

—(CH$_2$)$_a$—    (2)

(wherein a is 0 or 1);
that the added amount of the photopolymerizable compound in the liquid crystal composition is not less than 1.0 wt. % and not more than 3.0 wt. %; that any retardation value (Δn·d) of the above-described domains is in the range of 350 nm±70 nm; that not less than two areas having different liquid crystal layer thicknesses are formed in a pixel; that the pretilt angle of the liquid crystal molecules in the liquid crystal display device is not less than 88°; that the pretilt angle in the domain having the highest threshold voltage is about 90°; and that the liquid crystal molecules have a structure in which they are tilted while the tilting directions are regulated by protrusions formed on a substrate or slits in an electrode when a voltage is applied.

In another aspect of the present invention, provided is a method for manufacturing a liquid crystal display device comprising: electrodes that are formed on at least one of a pair of substrates, and are used for applying voltage onto liquid crystal molecules; a first alignment control layer that is sandwiched between the substrates, and makes the liquid crystal molecules aligned vertically; a liquid crystal layer formed by sandwiching a liquid crystal composition comprising a liquid crystal and a photopolymerizable compound between the substrates, followed by ultraviolet ray irradiation; and a second alignment control layer composed of a UV-cured product formed by the ultraviolet ray irradiation that is formed so that not less than two domains having different threshold voltages are present in a pixel, and at least one of domains has a threshold voltage higher than the threshold voltage by the first alignment control layer, wherein the ultraviolet ray irradiation is carried out to form the second alignment control layer in a state in which the rays are shaded or reduced in strength at part of a pixel.

By this aspect of the present invention, it is possible to manufacture liquid crystal display devices having good half-tone viewing angle characteristics.

Preferable are that the second alignment control layer is formed by the first ultraviolet ray irradiation followed by a second ultraviolet ray irradiation in which the ultraviolet rays are irradiated all over the liquid crystal panel with an ultraviolet ray intensity weaker than the intensity at the first ultraviolet ray irradiation; that the second ultraviolet ray irradiation is carried out while a voltage is applied; that the applied voltage is not more than the highest threshold voltage in domains having the higher threshold voltages generated by the first ultraviolet ray irradiation; that a heat treatment is carried out before the second ultraviolet ray irradiation; that the liquid crystal display device is constructed so that the mutual border between the above-described domains is approximately in parallel with the tilting direction of the liquid crystal molecules; that protrusions formed on a substrate or slits in an electrode makes the mutual border between the domains; that the difference between the maximum value and the minimum value of the different threshold voltages is not less than 0.3 V; that two domains having the above-described different threshold voltages are formed in a pixel, and the divisional ratio of the domain having the lower threshold voltage: the domain having the higher threshold voltage in a pixel is in the range of 2:8 to 8:2; that the photopolymerizable compound has a ring structure; that the photopolymerizable compound comprises a bifunctional photopolymerizable compound represented by the following formula (1),

α-Y-A-X—B—Z-α    (1)

(wherein A and B are, independently from each other, a ring group; α's are, independently from each other, an acrylate group or a methacrylate group; and X, Y and Z are, independently from each other, a group or direct bond to bind the groups);
that the photopolymerizable compound comprises two types: a bifunctional photopolymerizable compound according to formula (1) wherein X is a direct bond, and a bifunctional photopolymerizable compound according to formula (1) wherein X is not a direct bond; that, in formula (1), Y and Z are, independently from each other, represented by the following formula (2),

—(CH$_2$)$_a$—    (2)

(wherein a is 0 or 1); and that the added amount of the photopolymerizable compound in the liquid crystal composition is not less than 1.0 wt. % and not more than 3.0 wt. %.

It is possible to realize a liquid crystal display device having good half-tone viewing angle characteristics by the present invention.

DESCRIPTION OF THE PREFERRED EMBODIMENTS

Embodiments according to the present invention will be described below with reference to the following views, tables, formulae, examples, etc. It is to be understood that these views, tables, formulae, examples, etc., plus the explanation below are for the purpose of illustrating the present invention, and do not limit the scope of the present invention. It goes without saying that other embodiments should also be included in the category of the present invention as long as they conform to the gist of the present invention. In the figures, the same sign indicates the same element.

A liquid crystal display device according to the present invention is equipped with a liquid crystal display panel comprising: electrodes that are formed on at least one of a pair of substrates, and are used for applying voltage onto liquid crystal molecules; a first alignment control layer that is sandwiched between the substrates, and makes the liquid crystal molecules aligned vertically; a liquid crystal layer formed by sandwiching a liquid crystal composition comprising a liquid crystal and a photopolymerizable compound between the substrates, followed by ultraviolet ray irradiation; and a second alignment control layer composed of a UV-cured product formed by the ultraviolet ray irradiation that is formed so that not less than two domains having different threshold voltages are present in a pixel, and at least one of the domains has a threshold voltage higher than the threshold voltage by the first alignment control layer. By this configuration, it is possible to realize a liquid crystal display device having good half-tone viewing angle characteristics.

Figure 4A:
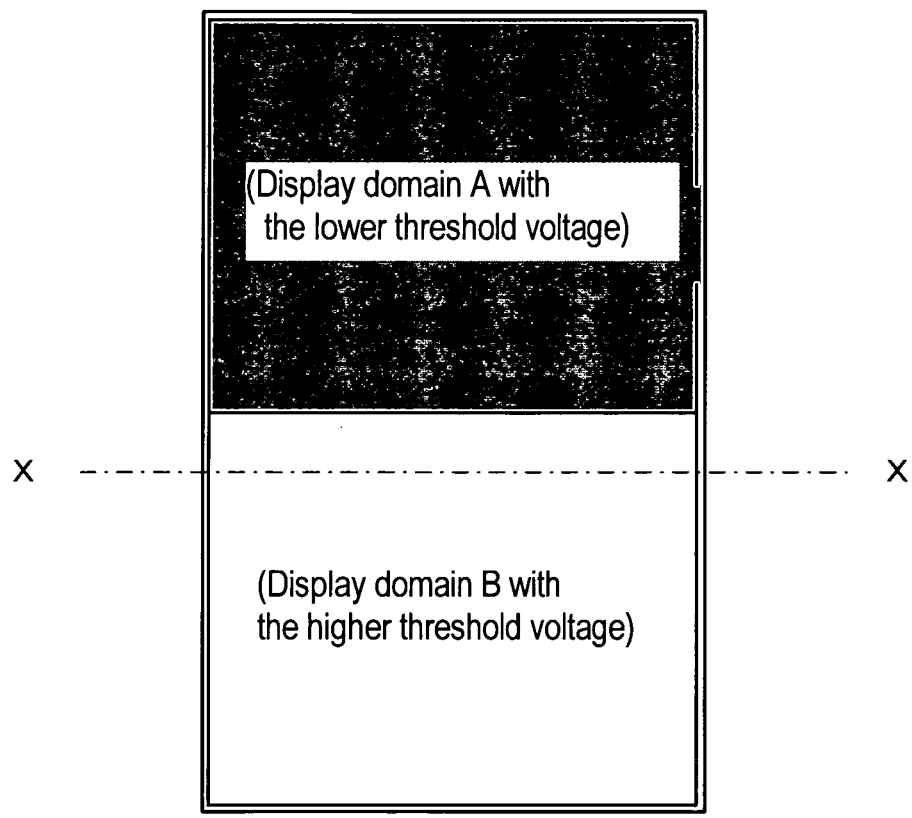
FIG. 4A is a schematic view of a pixel having two domains (A, B) with threshold voltages different from each other.
Figure 4B:
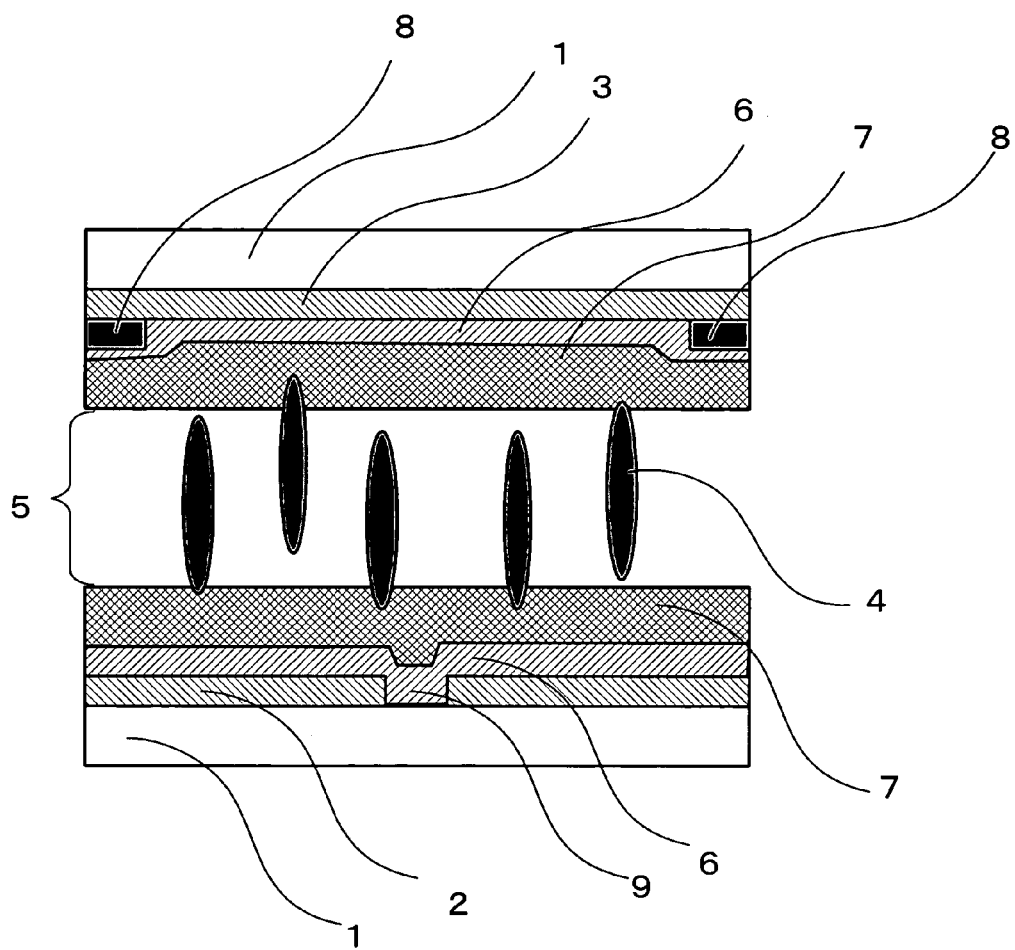
FIG. 4B is a schematic view showing a cross-sectional structure of a display region of a liquid crystal display panel.
Figure 4C:
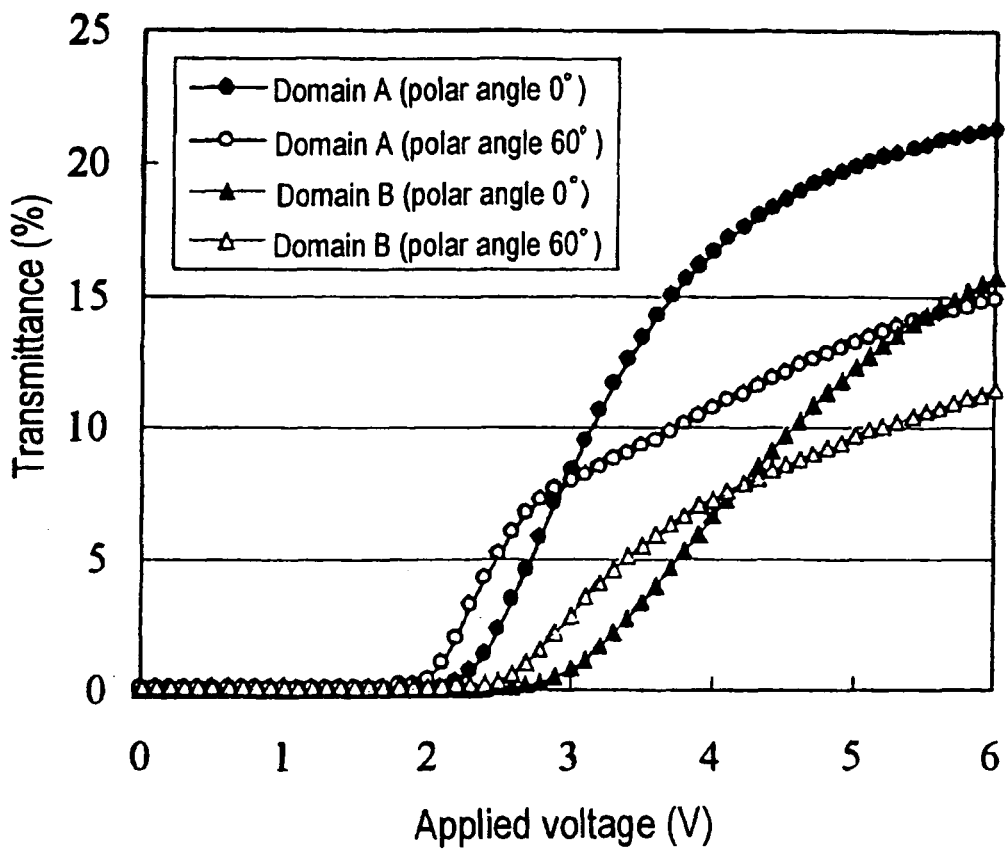
FIG. 4C is a graph showing T-V characteristics of two domains with threshold voltages different from each other.

The basic principle of the present invention is shown in FIGS. 4A to 4C. Each pixel is made to have two or more domains having T-V characteristics with different threshold voltages. FIG. 4A is a plan view of a pixel, and FIG. 4B is its cross-sectional view at X-X. In FIGS. 4A and 4B, there are two domains A and B with the threshold voltages different from each other at an area ratio of 1:1. In this example, the display region of the liquid crystal display panel comprises substrates 1, a transparent electrode 2, a counter electrode 3, a liquid crystal layer 5 comprising liquid crystal molecules 4, first alignment control layers 6, second alignment control layers 7, protrusions 8 which will be explained later, and electrode slits 9, as shown in FIG. 4B.

Figure 1A:
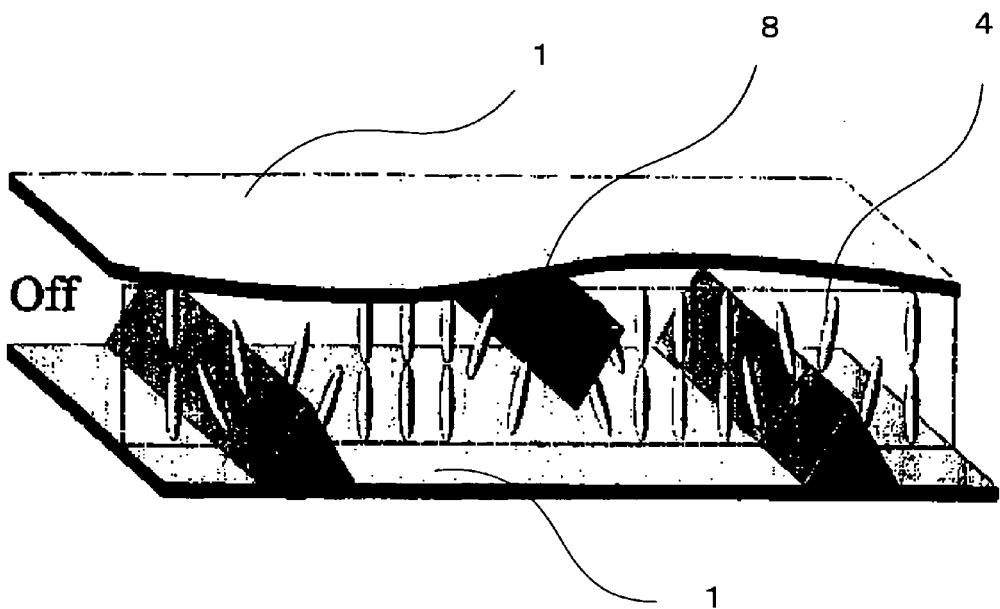
FIG. 1A is a conceptual view showing an MVA mode liquid crystal display device.
Figure 1B:
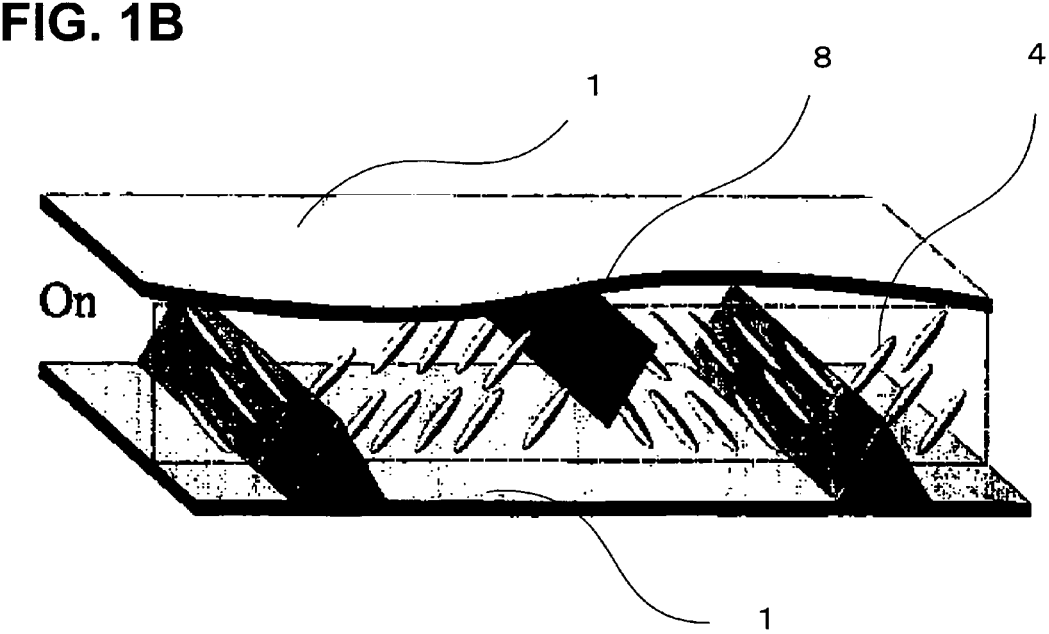
FIG. 1B is another conceptual view showing an MVA mode liquid crystal display device.
Figure 2:
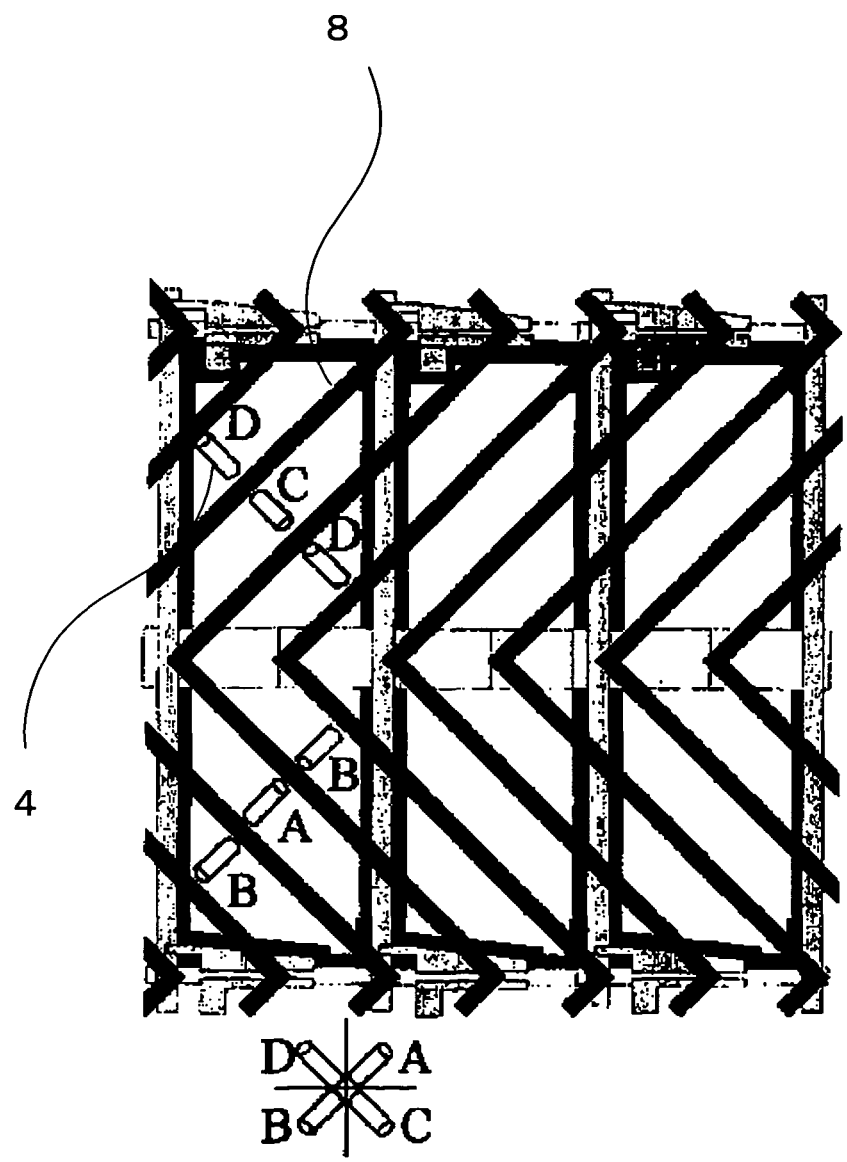
FIG. 2 is a conceptual view showing the alignment directions of liquid crystal molecules in an MVA mode liquid crystal display device.
Figure 3:
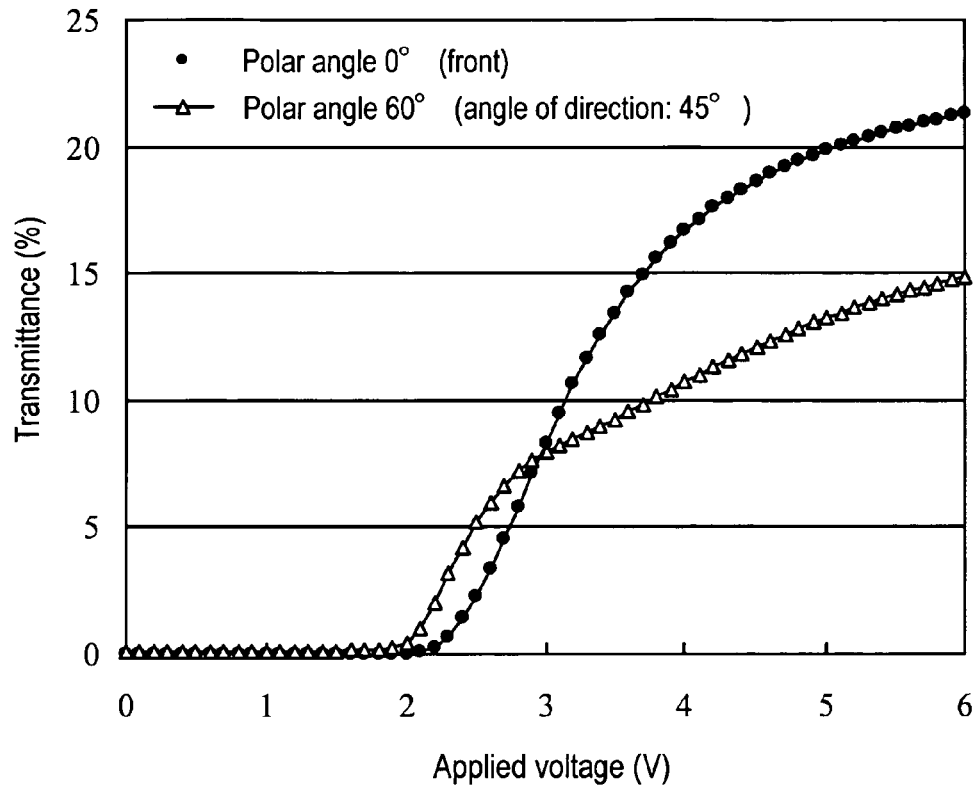
FIG. 3 is a graph showing T-V characteristics of a conventional MVA mode liquid crystal display device.
Figure 3:
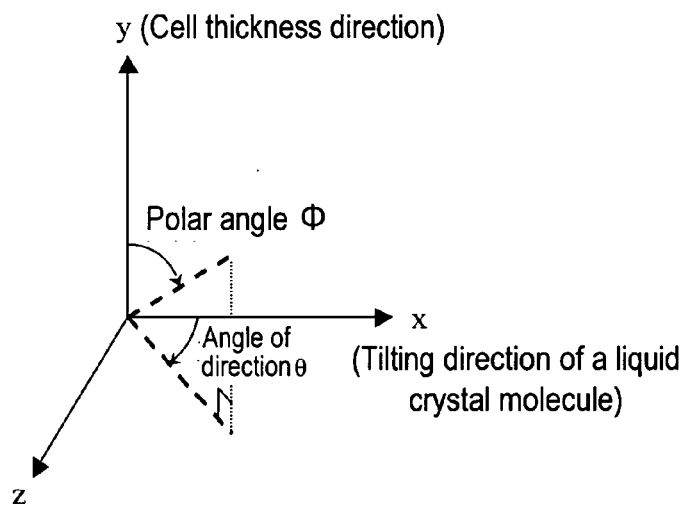
Figure 5:
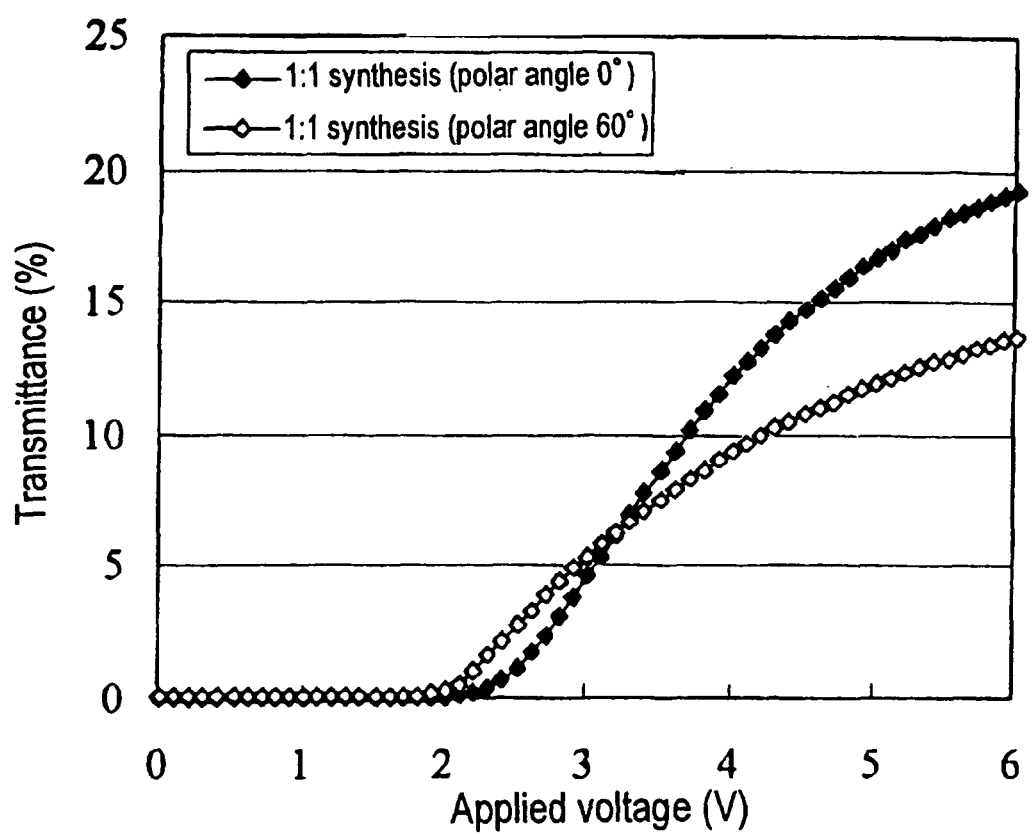
FIG. 5 is a graph showing T-V characteristics averaged on the whole pixel having two domains with threshold voltages different from each other.

When two domains with different threshold voltages are formed as shown in FIG. 4A, T-V characteristics as shown in FIG. 4C are obtained for the respective domains, and T-V characteristics which are averaged for the whole pixel are obtained as shown in FIG. 5. When they are compared with usual T-V characteristics in FIG. 3, it is understood that the increase and decrease of the T-V curve in a diagonal direction (polar angle of 60°) as opposed to the T-V curve at the front (polar angle of 0°) are more moderate, and accordingly, good half-tone viewing angle characteristics are obtained with less difference between the display image when seen at the front and the display image when seen in the diagonal direction.

This partitioning can be realized by sandwiching a liquid crystal composition comprising a liquid crystal and a photopolymerizable compound between the substrates, followed by ultraviolet ray irradiation to form a second alignment control layer or layers made of a UV-cured product as well as a liquid crystal layer. By the ultraviolet ray irradiation, the photopolymerizable compound in the liquid crystal composition is polymerized to be a UV-cured product, which forms a layer or layers to contact the liquid crystal layer composed of a liquid crystal composition that has lost the photopolymerizable compound (that is, substantially consisting of the liquid crystal). Thus, domains having different threshold voltages are formed when the layer or layers of the UV-cured product are formed that restrain the movement of the liquid crystal molecules.

When a second alignment control layer or layers are obtained, it is possible to form domains with different threshold voltages by irradiating ultraviolet rays over only a specific domain with the liquid crystal molecules having a small pretilt angle to form a UV-cured product, stabilizing the state of the liquid crystal molecules, and lowering the threshold voltage in the domain. However, it is considered that an angle of not less than 88° is necessary for the pretilt angle in order to secure contrast that is generally needed, and it is often difficult to realize a sufficient difference in threshold voltage by decreasing the pretilt angle to such a small extent of 2° angle. Accordingly, for realizing a sufficient difference in threshold voltage, it is necessary to make the pretilt angle so small as to victimize the contrast.

It was found that the above difference in threshold voltage can be realized, not by lowering the threshold voltage, but by raising the threshold voltage through making the movement of the liquid crystal molecules in a specific domain hard in a vertical alignment state with a UV-cured product.

It is possible to realize two or more domains having different threshold voltages in a pixel, by carrying out ultraviolet ray irradiation with a specific domain in a pixel masked from the rays, and changing the conditions of the ultraviolet ray irradiation. The state in which the UV-cured product restrains the liquid crystal molecules changes by changing the conditions of ultraviolet ray irradiation, and accordingly the threshold voltage can be changed.

Regarding the two or more domains with different threshold voltages according to the present invention, it is preferable that at least one of the domains has a threshold voltage higher than the threshold voltage by the first alignment control layer. In this way, a large difference in threshold voltage, and accordingly good half-tone viewing angle characteristics are realized.

There is no limitation to the disposition of the two or more domains with different threshold voltages according to the present invention in a pixel, as long as it does not contradict the gist of the present invention. However, it was found that when the liquid crystal molecules have a specific tilting direction, and the mutual border between the above-described domains is disposed to be perpendicular to the tilting direction, part of the domain with the lower threshold voltage tends to acquire a property of showing a higher threshold voltage, and alignment disorder would occur in the part depending on the applied voltage, resulting in display irregularities in the liquid crystal display panel.

Such a problem can be solved by disposing the mutual border between the above-described domains approximately in parallel with the tilting direction of the liquid crystal molecules. For example, when the tilting direction of the liquid crystal molecules is regulated by protrusions formed on the substrate or electrode slits, it is sufficient to dispose the above-described border perpendicular to the lengthwise direction of the protrusions or electrode slits, since the tilting direction of the liquid crystal molecules is perpendicular to the lengthwise direction of the protrusions or electrode slits. It is to be noted that the "approximately in parallel with" means that strict parallelism is not required. It is usually sufficient if a parallel relationship is recognized with eyes. To be more concrete, it is considered to be approximately parallel if the display irregularities in a liquid crystal display panel can be restrained or prevented.

Also, it was found that even when the above-described border is perpendicular to the tilting direction of the liquid crystal molecules, it is possible to restrain the display irregularities in a liquid crystal display panel by forming the border between the domains so that part of the domain with the lower threshold voltage which comes to acquire a property of showing a higher threshold voltage is made to occur in a portion which hardly influences on the display in the liquid crystal display panel.

To be specific, when protrusions and electrode slits for regulating the tilting directions of the liquid crystal molecules are formed on the substrate, it is preferable to dispose the border on them so that the protrusions and electrode slits make the mutual border between the domains.

Figure 6:
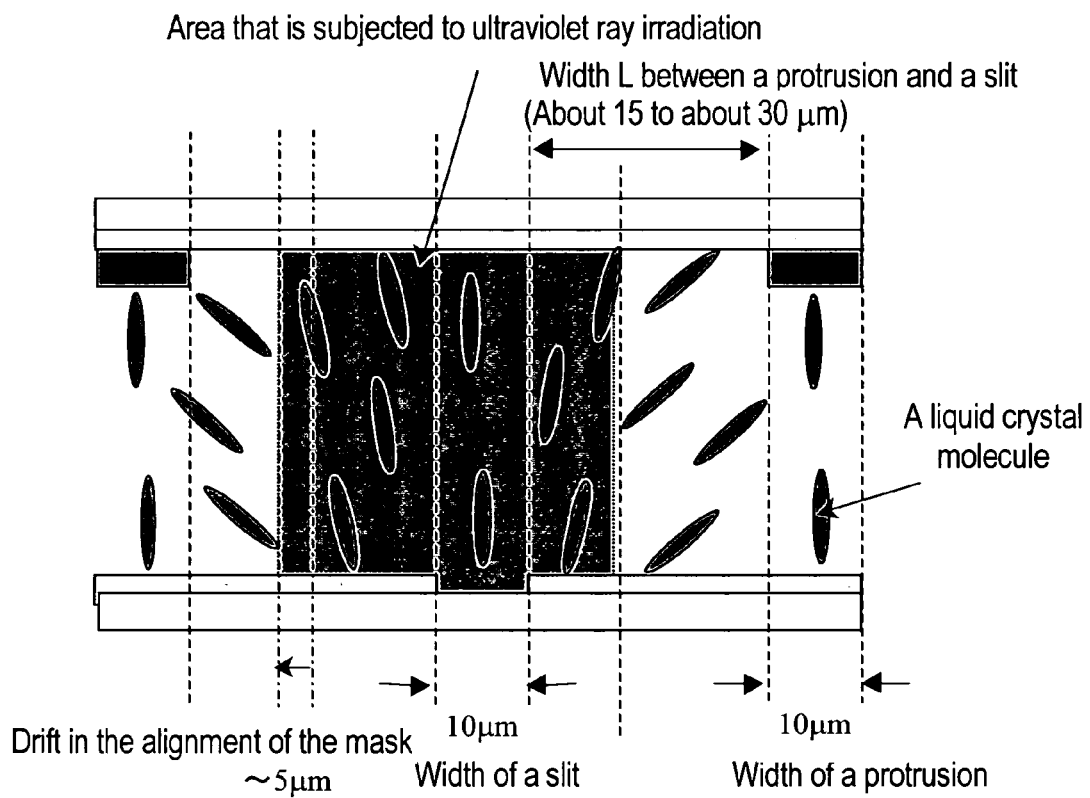
FIG. 6 is a schematic side cross-sectional view of a liquid crystal display panel showing the locational relationship between light-shielding parts of a mask, and protrusions and electrode slits.

As shown in FIG. 6, the width L between protrusions or electrode slits is as small as about 15 to about 30 µm in a mode such as the MVA mode or PVA (Patterned Vertical Alignment) mode in which the alignment control is carried out by the protrusions and electrode slits. If it is tried to form a domain with the higher threshold voltage so that the border between the higher threshold voltage domain and lower threshold voltage domain is in parallel with the protrusions or electrode slits within such a small width, problems would occur such as one in which an area with a width that cannot be ignored as opposed to the L value (5 µm, for example) and which should be included in the lower threshold voltage domain comes to show a higher threshold voltage owing to the diffraction of the ultraviolet rays at the border, and one in which the area ratio of the higher threshold voltage domain and the lower threshold voltage domain for each tilting direction changes greatly, even if a slight drift in the alignment of a mask at the time of ultraviolet ray irradiation occurs (to the left or right direction of an area that should be in the higher threshold voltage domain, for example). FIG. 6 shows a state in which a drift to the left has occurred.

Figure 7:
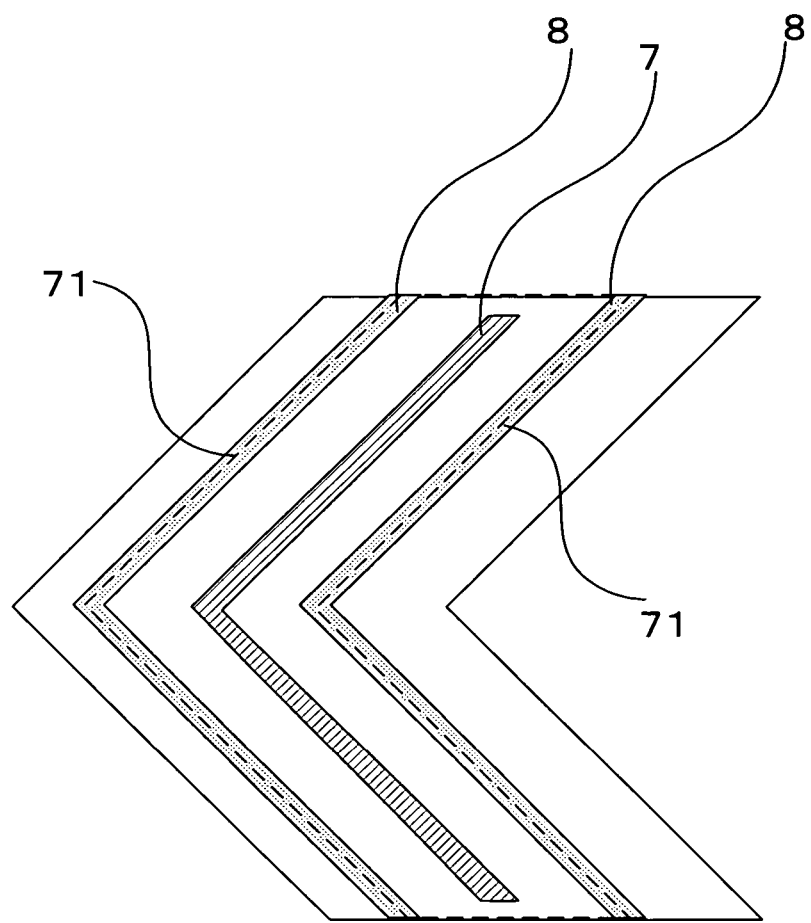
FIG. 7 is a schematic view showing a pixel having electrode slits and protrusions both in a dogleg shape overlapped with light-shielding parts of a mask.

In such cases, it is possible to realize still better domain partitioning, by overlapping the border between the higher threshold voltage domain and the lower threshold voltage domain onto the protrusions or electrode slits formed on the substrate. Particularly when a pixel is designed to have electrode slits 7 and protrusions 8 in a "dogleg" shape as shown in FIG. 7, it is possible to realize extremely fine domain partitioning, if a border 71 between the higher threshold voltage domain and the lower threshold voltage domain is formed to be overlapped onto the "dogleg" shape spacing units. A "dogleg" shape spacing unit is not necessarily determined by the adjacent protrusions, and can be determined by an appropriately selected electrode slit and protrusion.

Regarding the improvement of the half-tone viewing angle characteristics that is the purpose of the present invention, not a small level of improvement can be observed, if domains with different threshold voltages are present. To acquire a definite effect, it is preferable that the threshold voltage difference between the domain with the smallest threshold voltage and the domain with the largest threshold voltage is about 0.3 V at the minimum. It is more preferable the threshold voltage difference is in the range of about 0.5 to about 0.7 V to realize a still larger effect.

On the other hand, since the luminance of the liquid crystal panel decreases greatly when the threshold voltage difference is excessively large, it is not always true that the larger the threshold voltage difference is, the better the effect is. Accordingly, it is preferable to determine the threshold voltage difference in consideration of the luminance of the liquid crystal panel. It is to be noted, hereupon, that, in the present invention, the threshold voltage means a voltage when the transmittance is 1% in a T-V curve.

The UV-cured product may be obtained by having a photopolymerizable compound that can be polymerized by ultraviolet rays present between the substrates together with a liquid crystal beforehand, and polymerizing it with ultraviolet rays. This photopolymerizable compound is crosslinked at the polymerization to be a cured product. The ultraviolet ray irradiation may be carried out at room temperature. Or, it may be carried out while heating, when the polymerization of the photopolymerizable compound can be accelerated by heat.

The degree of the improvement of the half-tone viewing angle characteristics depends on the level of the threshold voltage difference. The degree of the improvement also varies according to the area ratio of the domains with different threshold voltage differences. The larger the area ratio of the higher threshold voltages is, the larger the degree of the improvement of the half-tone viewing angle characteristics is. At the same time, the transmittance becomes smaller. Balancing between the transmittance and the level of the improvement is an important factor, and accordingly the divisional ratio of an area of the domain having the lower threshold voltage versus an area of the domain having the higher threshold voltage in a pixel is preferably in the range of 2:8 to 8:2. In more particular, the ratio in the range of 6:4 to 4:6 tends to give especially well-balanced results. When it is tried to improve the half-tone viewing angle characteristics with putting emphasis on the transmittance, it is effective to select 8:2 as the divisional ratio of the domain having the lower threshold voltage: the domain having the higher threshold voltage. On the contrary, when it is desired to improve the half-tone viewing angle characteristics as much as possible even though the transmittance is sacrificed to some extent, it is effective to select 2:8 as the divisional ratio of the domain having the lower threshold voltage: the domain having the higher threshold voltage. Furthermore, when the ratio of the higher threshold voltage domain is extremely large (90%, for example), there may be cases in which the transmittance becomes low while the degree of the improvement of the half-tone viewing angle characteristics itself becomes smaller.

It is to be noted, here, that the images when seen at the front and diagonally give substantially different retardation values in the construction of a VA (Vertical Alignment) mode liquid crystal display panel. A compensation film is used to compensate this retardation change and improve the contrast characteristics. However, since this compensation film provides optical compensation all over the liquid crystal panel, there will be a problem that excessive compensation occurs in some areas, while deficient compensation occurs in other areas, when the differences of retardation is too large in the liquid crystal layer.

For this reason, it is preferable to form domains with different threshold voltages and keep the retardation values ($\Delta n \cdot d$) of the respective domains with the different threshold voltages in a certain range at the same time. To be concrete, it is preferable to keep them in an allowable level, that is, within ±20% of the retardation value which is assumed for the compensation film. When the refractive index anisotropy of the liquid crystal is 0.10, the retardation value is usually set to be about 350 nm when the cell thickness is 3.5 μm. Accordingly, the range within 350 nm±70 nm is a preferable condition.

When areas where the retardation value deviates from the above-described set range occur after the second alignment control layer is formed, it is possible to realize the adjustment of the retardation into such a range, by partially changing the thickness of the liquid crystal layer in one pixel. The partial changing of the thickness of the liquid crystal layer in one pixel can be realized, for example, by partially changing the thickness of the color filters, or partially changing the thickness of the second alignment control layer through changing the concentration of the photopolymerizable compound in the liquid crystal composition.

From the viewpoint of securing sufficient contrast, it is preferable that the pretilt angle of the liquid crystal molecules is not less than 88° in each domain. It is particularly preferable that the pretilt angle in the domain having the highest threshold voltage is about 90°, since the threshold voltage tends to fall down as the pretilt angle of the liquid crystal molecules becomes smaller. That is, it is preferable that the pretilt angle is not less than 88°, and as near to 90° as possible. To be more specific, 89.5° or a higher value is preferable.

Any substrate material that is used for a liquid crystal display panel may be used for the substrate according to the present invention. Any material that is used for a liquid crystal display panel may be used for the first alignment control layer according to the present invention, as long as it is for the vertical alignment use. The first alignment control layer may be installed only on one side of the liquid crystal layer. However, it is preferable to install two first alignment control layers on both sides of the liquid crystal layer. The liquid crystal according to the present invention may be selected from among known liquid crystal materials having a negative dielectric anisotropy. The liquid crystal display panel according to the present invention preferably has protrusions and/or electrode slits installed on the substrate surface as described above so that it has a structure in which the liquid crystal molecules are tilted while the tilting directions are regulated by the protrusions and/or electrode slits formed on the substrate when a voltage is applied.

Regarding the above-described liquid crystal display panel, an example of a method for forming domains with different threshold voltages in a pixel will be described in the following. First, parts of the pixels of the liquid crystal display panel are masked, and a first ultraviolet ray irradiation is carried out to form a UV-cured product selectively in the areas which are not masked, by irradiating ultraviolet rays over the liquid crystal composition comprising a liquid crystal and a photopolymerizable compound sandwiched between the substrates of the liquid crystal display panel. By this, domains with the higher threshold voltages are formed. The masking may be carried out in which the ultraviolet rays are completely shaded or reduced in strength.

Although it is not impossible to use a layer formed from the UV-cured product in this state as the second alignment control layer, it is preferable to carry out the second ultraviolet ray irradiation by irradiating the whole surface of the liquid crystal display panel with ultraviolet rays weaker than those at the first ultraviolet ray irradiation to form the UV-cured product in the whole areas (the areas previously masked as well as those unmasked), because a photopolymerizable compound and/or uncured product still remains in the liquid crystal in the masked areas only after the first ultraviolet ray irradiation.

In this way, the UV-cured product is formed even in areas that have not been masked to complete the second alignment control layer, while the threshold voltage in the areas that have been masked can be kept from shifting to a higher voltage.

This second ultraviolet ray irradiation may be carried out with voltage application. When the second ultraviolet ray irradiation is carried out with voltage application, the response speed of the liquid crystal molecules from the vertically aligned state to the horizontally aligned state can be made larger by the pretilting effect. In this case, it is possible not only to restrain the decrease in the threshold voltage difference by the second ultraviolet ray irradiation, but also to enlarge the threshold voltage difference, by carrying out the second ultraviolet ray irradiation with application of a voltage which is not more than the threshold voltage of the domain formed by the first ultraviolet ray irradiation. Furthermore, improvement in the response speed of the liquid crystal can also be expected.

Although the second ultraviolet ray irradiation may also be carried out using a mask so as to irradiate only the areas that have not been irradiated with ultraviolet rays, it is preferable to irradiate all over the surface in consideration of the alignment margin. A heat treatment carried out before the second ultraviolet ray irradiation may restrain the threshold voltage difference from decreasing further effectively, and is preferable. It is considered to be because this will make the remaining unreacted photopolymerizable compound and/or a polymer with incomplete curing dispersed uniformly all over the liquid crystal panel, minimizing the influence on the restraint of the movement of the liquid crystal molecules by the UV-cured product occurred by the second ultraviolet ray irradiation in the areas where ultraviolet ray has not been irradiated.

It is to be noted that, when three or more domains with different threshold voltages are formed, a method in which the areas to be masked are changed, or a method in which the conditions of the first and/or second ultraviolet ray irradiation are changed, is considered for making such domains. When the first ultraviolet ray irradiation is carried out a plurality of times while the areas to be masked and the conditions for the ultraviolet ray irradiation are changed, the "voltage not more than the highest threshold voltage in the domains with the higher threshold voltages obtained by the first ultraviolet ray irradiation" may be employed instead of the "voltage not more than the threshold voltage in the area which has been irradiated at the first ultraviolet ray irradiation", when a voltage is applied during the second or later irradiation.

It was found extremely important to use a photopolymerizable compound that has a strong interaction with the liquid crystal molecules in order to realize the threshold voltage difference by the UV-cured product consistently. While the UV-cured product is obtained by polymerizing the photopolymerizable compound in a liquid crystal composition comprising a liquid crystal and a photopolymerizable compound, the composition being sandwiched between the substrates, any known compound may be used as the photopolymerizable compound in the present invention if it is polymerized by ultraviolet rays to form a cured product, and as long as it does not contradict the gist of the present invention.

In general, it can be selected from among so-called monomers and oligomers. Examples are compounds having a photoreactable group such as an acrylate group and/or methacrylate group for acrylic acid esters and methacrylic acid esters for example, as well as an epoxy group, vinyl group and allyl group.

The photopolymerizable compound may consists of one component, or a plurality of components. It is preferable that the photopolymerizable compound consists of or comprises a cross-linkable component for curing. As a cross-linkable component, enumerated are those compounds that has a structure part that has a plurality of polymerizable double bonds such as acrylate groups, methacrylate groups, epoxy groups, vinyl groups or allyl groups in a molecule as a photoreactable group, and is polymerizable with other molecules by ultraviolet ray irradiation.

Furthermore, it is preferable to mainly use a photopolymerizable compound having two or more photoreactable groups in a molecule, so that the anchoring energy to the liquid crystal molecules in the second alignment control layer does not change with time.

The photopolymerizable compound preferably has a ring structure. The ring structure includes aromatic rings including fused rings and heterocyclic rings as well as alicyclic rings. It may contain a substituent group. For example, when lauryl acrylate that is monofunctional and does not have a ring structure is mainly used, its effect to change the threshold voltage is poor, and light is often scattered greatly in the liquid crystal layer if the added amount is raised. Materials that are bifunctional photopolymerizable compounds but do not have a ring structure such as 1,6-hexanediol diacrylate give a similar result: light is scattered in the liquid crystal layer sometimes at a stage in which the threshold voltage difference is short of the require value.

While photopolymerizable compounds having a ring structure has a large effect to change the threshold voltage even when they are monofunctional photopolymerizable compounds, degradation with time or due to heat is large, and it is difficult to maintain consistent properties for a long time. Accordingly, photopolymerizable compounds having a ring structure and a plurality of photoreactable groups are often more preferable.

In the present invention, the threshold voltage is shifted not by the so-called PDLC (Polymer Dispersed Liquid Crystal), but by the alignment control layer or layers made of a UV-cured product. Accordingly, it is possible to form a domain having a higher threshold voltage, while maintaining the "alignment state without light scattering".

As a result of investigations, it was found that a threshold voltage difference can be easily realized with a high effect, when the photopolymerizable compound comprises a bifunctional photopolymerizable compound represented by formula (1).

$$\alpha\text{-Y-A-X—B—Z-}\alpha \qquad (1)$$

Here, A and B are, independently from each other, a ring group represented by a benzene ring or a cyclohexane ring, and α's are, independently from each other, a photoreactable group. An acrylate group and methacrylate group are examples of the photoreactable group.

X, Y and Z are, independently from each other, a group to bind A, B and α's to each other. They may be a direct linkage. In the case of a direct linkage, structures in which ring groups are directly bound to each other and structures in which a ring group and a photoreactable group are directly bound to each other are included. While it is possible to achieve the purposes of the present invention when a photopolymerizable compound having three or more ring groups is used instead of the two ring groups in formula (1), it is often undesirable, because its compatibility with a liquid crystal is poor, causing a new problem of uneven distribution of the photopolymerizable compound concentration in the liquid crystal panel.

Among the structures represented by formula (1), compounds with a higher rigidity form an alignment control layer that restrains the liquid crystal molecules more strongly. That is, when X which binds the ring groups is a direct linkage, the ability of the alignment control layer to restrain the movement of the liquid crystal molecules is higher than in a case in which some sort of a group is present. However, the higher the rigidity is, the lower the solubility into the liquid crystal material is, and accordingly, when only one type of photopolymerizable compound is used, it is often difficult to raise the concentration of the photopolymerizable compound in the liquid crystal composition to the level at which a desired threshold voltage difference is achieved.

On the other hand, when X is not a direct linkage, photopolymerizable compounds show an outstandingly good solubility, although some of them may show a tendency of somewhat inferior ability to restrain the movement of the liquid crystal molecules. Owing to this, it is possible, even by use of one type of photopolymerizable compound, to obtain a desired threshold voltage difference, while light scattering is prevented.

It is to be noted that it was found that a mixture of a photopolymerizable compound in which X is a direct linkage and a photopolymerizable compound in which X is not a direct linkage in a smaller amount makes it possible to realize a threshold voltage difference similar to the case in which only a photopolymerizable compound in which X is not a direct linkage is used. Furthermore, it was found that the margin of the irradiation intensity of ultraviolet rays is widened. For example, the fluctuation of the threshold voltage difference when the ultraviolet ray intensity is changed in a range of ±10% can be made smaller, when a photopolymerizable compound in which X is a direct linkage is added.

Regarding Y and Z to bind the photoreactable group and ring group, it is preferable they are a direct linkage or a —$CH_2$—, in terms of the reactivity of the photopolymerizable compound. It is because the reactivity decreases as the distance between the photoreactable group and ring group is larger, and even a —$(CH_2)_2$— could decrease the reactivity to an extreme extent. Also from the viewpoint of rigidity described above, it is preferable that Y and Z to bind the photoreactable group and ring group are a direct linkage or a —$CH_2$—. A direct linkage is more preferable.

It is possible to realize a desired threshold voltage difference by using photopolymerizable compounds such as described above. The added amount at about 0.5 wt. % level in a liquid crystal composition can change the threshold voltage. However, a concentration of 1.0 wt. % or more using a photopolymerizable compound having a structure according to the present invention is preferable to realize a sufficient threshold voltage difference, for examples, a threshold voltage that is from about 0.5 to about 0.7 V higher than the threshold voltage obtained by the first alignment control layer.

On the other hand, a large added amount may sometimes result in not only light scattering but also too large decrease in the maximum transmittance. This will cause a demerit of decrease in luminance which is larger than the merit of improvement of the half-tone viewing angle characteristics, the purpose of the present invention. Accordingly, the upper limit of the added amount is often preferably about 3.0 wt. %.

EXAMPLES

Examples of the present invention will be explained in detail in the following. The present invention is not limited by these examples.

Example 1

A bifunctional photopolymerizable compound having a ring structure was dissolved in an amount of 2.0 wt. % in a negative type liquid crystal having a refractive index anisotropy of 0.08, and a photoreaction initiator was added in an amount of 2.0 mol % based on the photopolymerizable compound to form a liquid crystal composition.

Two glass substrates with ITO (indium-tin oxides) formed as electrodes were used for the evaluation cell. Using a resist material, protrusions in a stripe form and having a height of 1.5 μm and a width of 10 μm were formed with a separation of 35 μm on each electrode.

Next, vertical alignment control films of a polyamic acid were formed by coating as the first alignment control layers according to the present invention, and the substrates were stuck to each other with a cell thickness of 4.25 μm so that the protrusions were made to be in parallel with each other and in an equidistantly spaced manner. Then the above-described liquid crystal composition was poured into the cell.

Figure 8A:
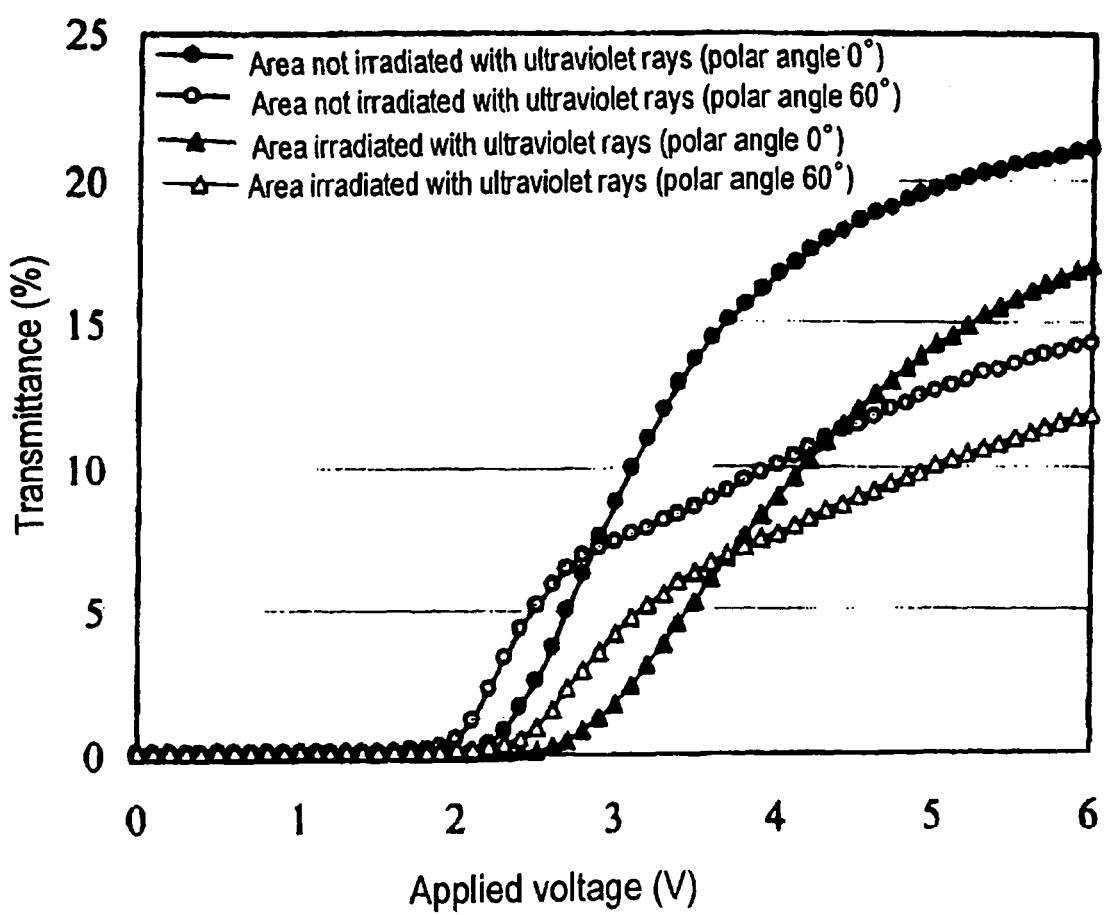
FIG. 8A is a graph showing T-V characteristics of a pixel in EXAMPLE 1.
Figure 8B:
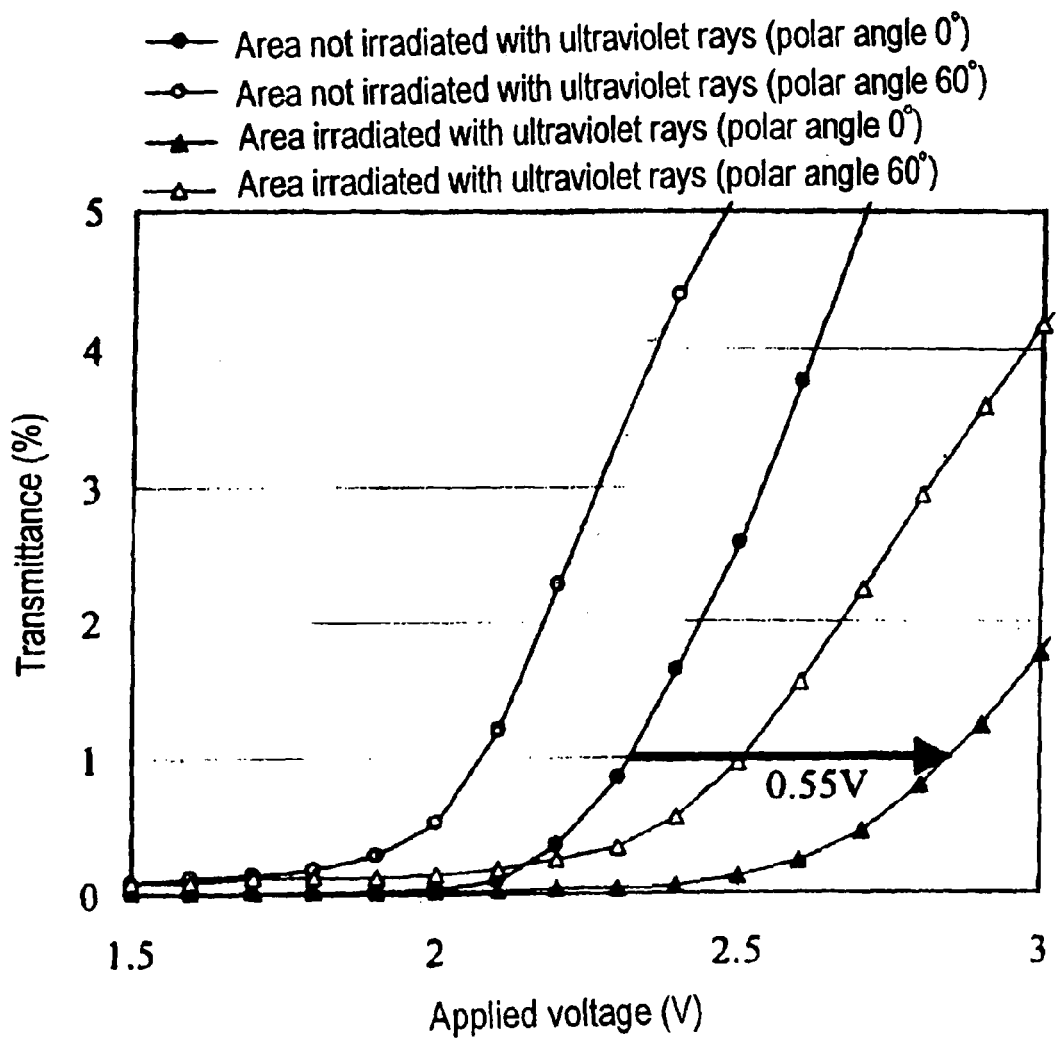
FIG. 8B is a partly enlarged view of FIG. 8A.
Figure 9A:
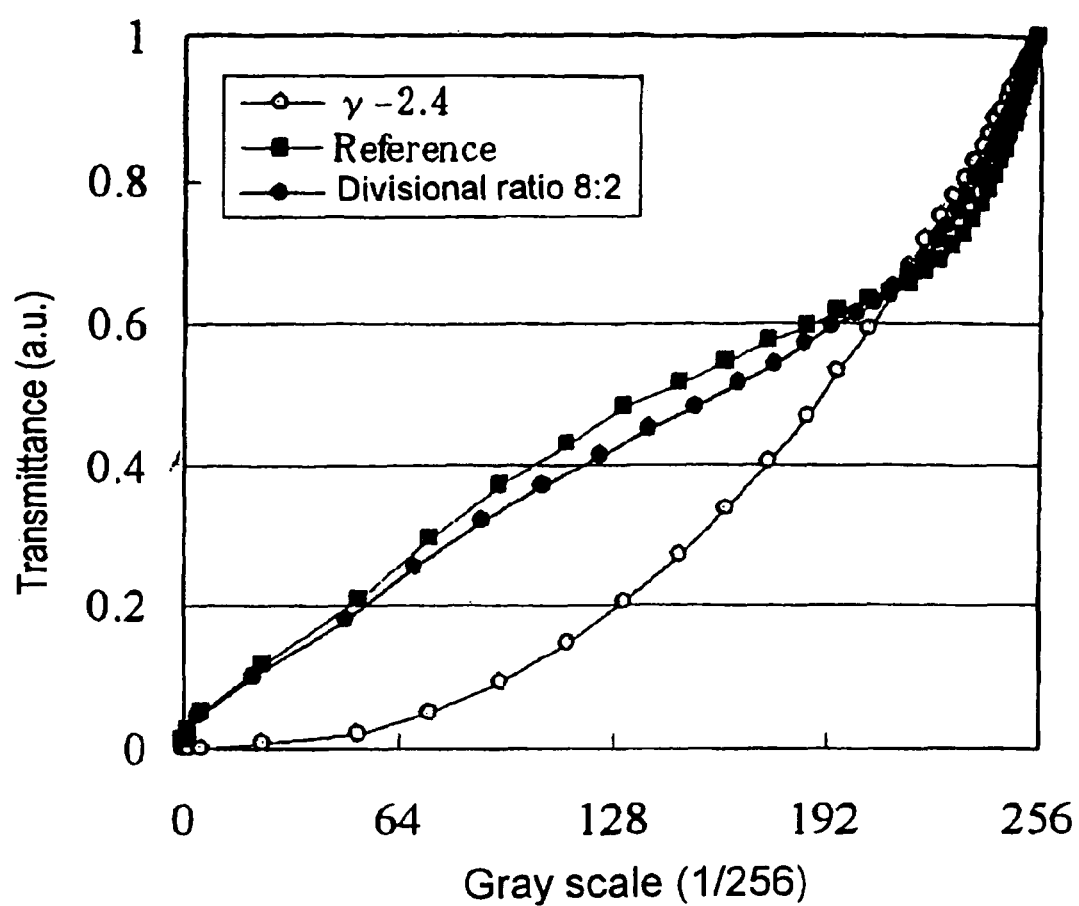
FIG. 9A is a graph showing the relationship between the transmittance and the gray scale in EXAMPLE 1.
Figure 9B:
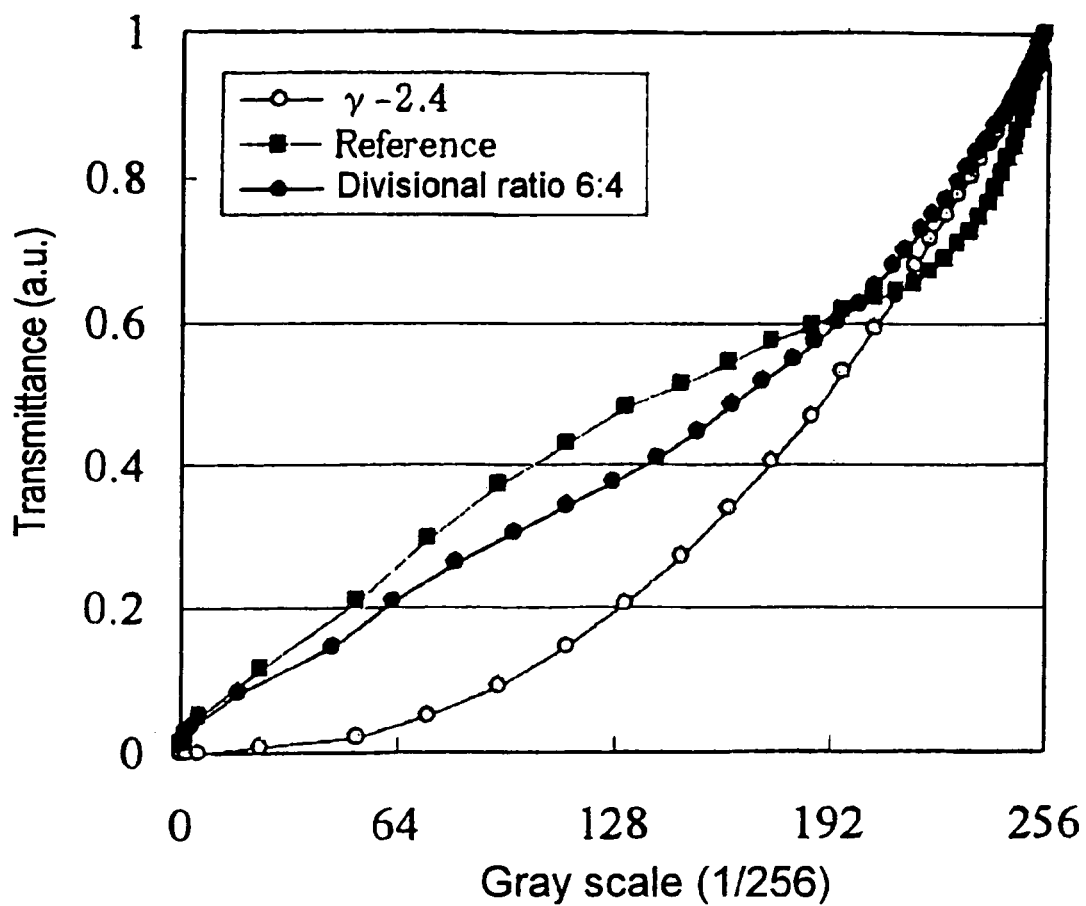
FIG. 9B is another graph showing the relationship between the transmittance and the gray scale in EXAMPLE 1.
Figure 9C:
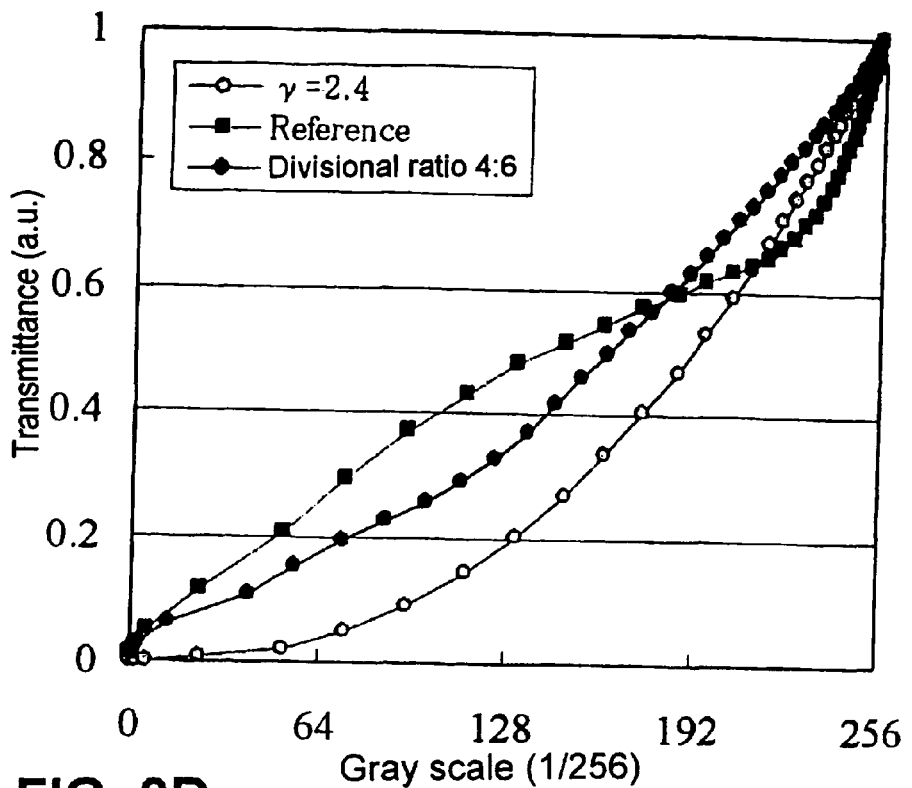
FIG. 9C is another graph showing the relationship between the transmittance and the gray scale in EXAMPLE 1.
Figure 9D:
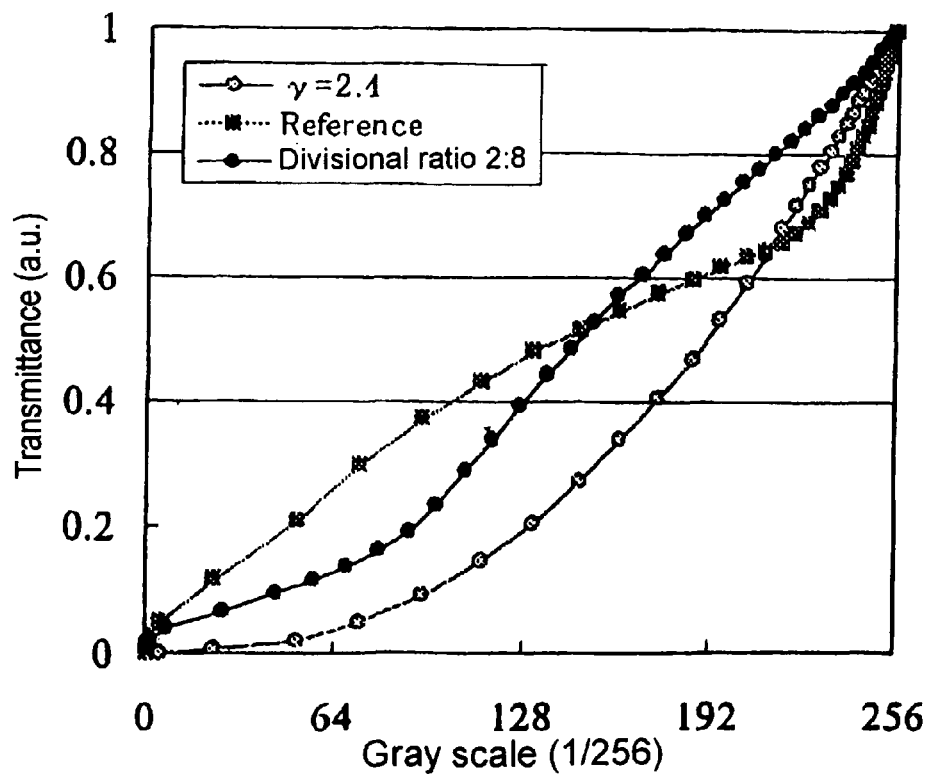
FIG. 9D is another graph showing the relationship between the transmittance and the gray scale in EXAMPLE 1.
Figure 10A:
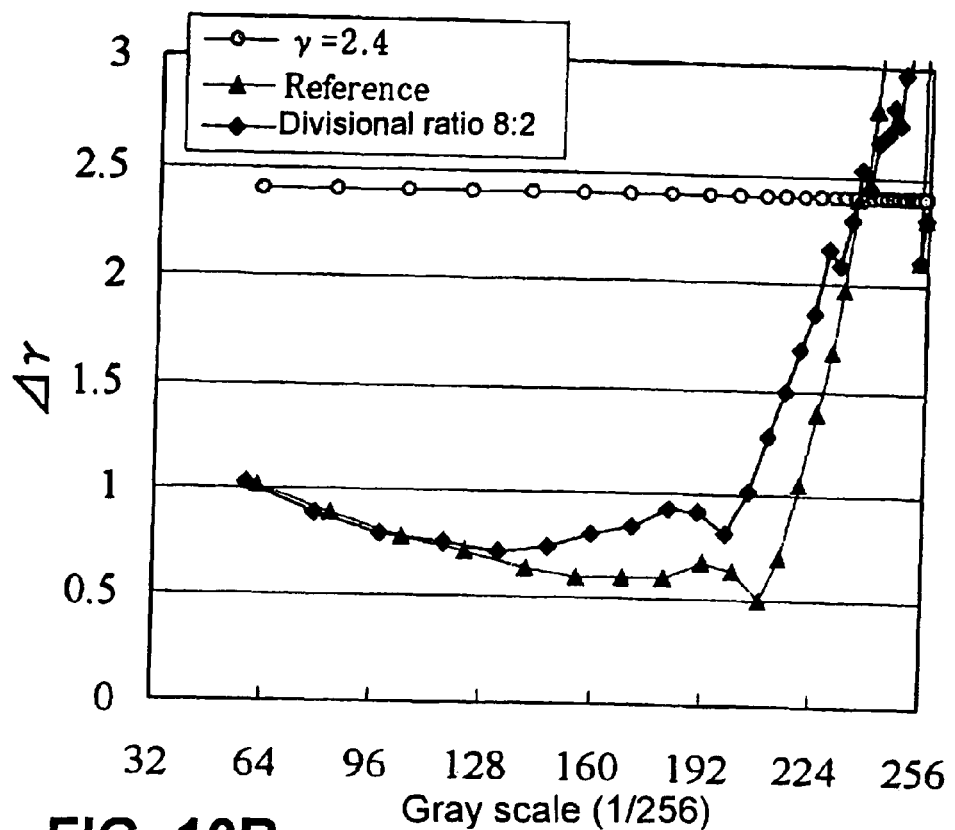
FIG. 10A is a graph obtained by differentiating the γ curve in FIG. 9A at each gray scale to obtain γ values in respective small ranges.
Figure 10B:
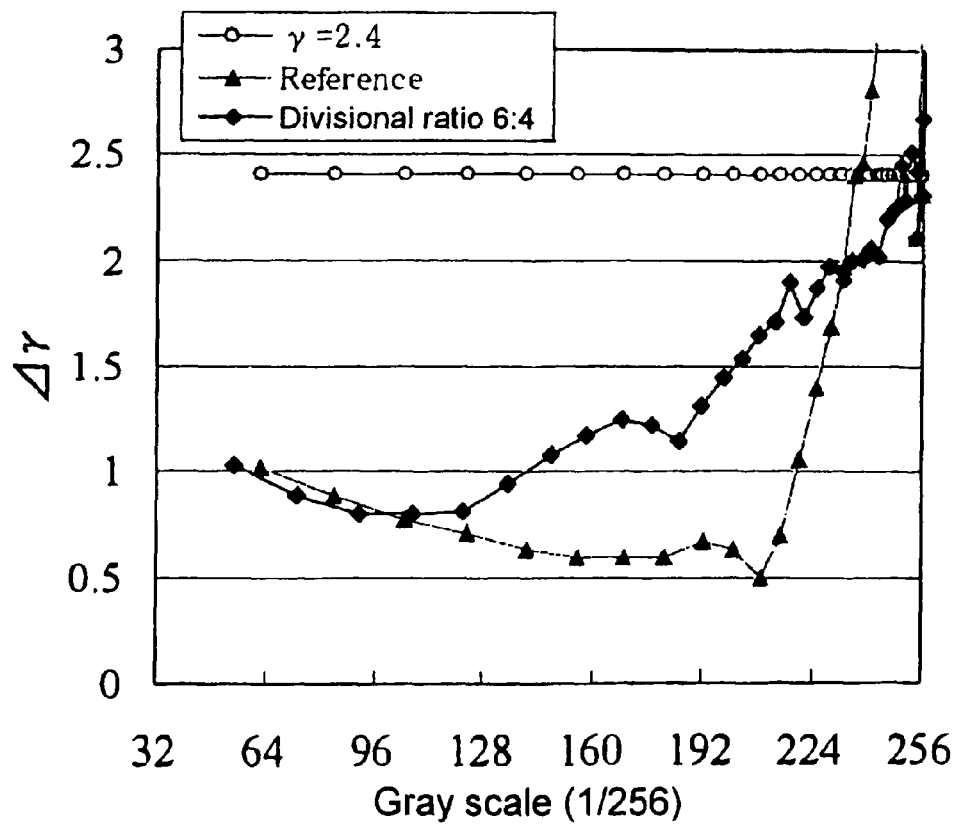
FIG. 10B is a graph obtained by differentiating the γ curve in FIG. 9B at each gray scale to obtain γ values in respective small ranges.
Figure 10C:
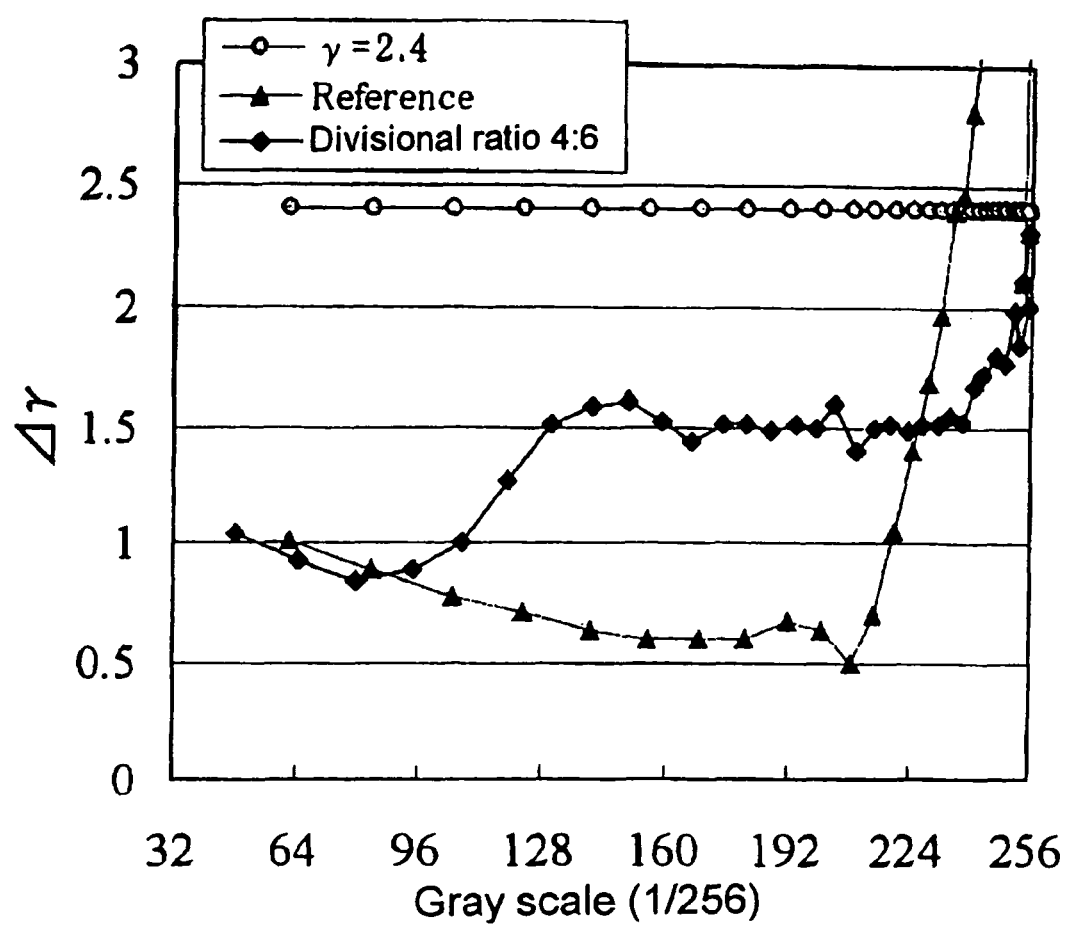
FIG. 10C is a graph obtained by differentiating the γ curve in FIG. 9C at each gray scale to obtain γ values in respective small ranges.
Figure 10D:
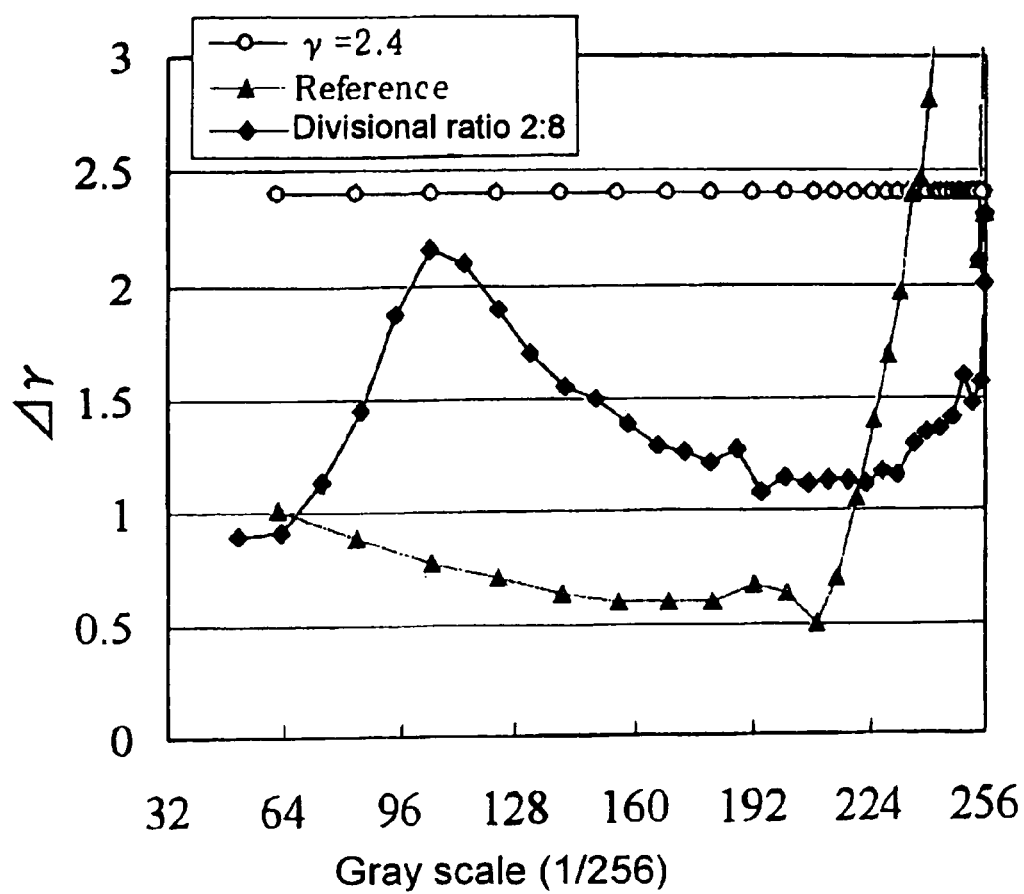
FIG. 10D is a graph obtained by differentiating the γ curve in FIG. 9D at each gray scale to obtain γ values in respective small ranges.

Half of the ITO electrodes were shaded with a mask, unpolarized ultraviolet rays were irradiated at 5 mW/$cm^2$ for 10 J/$cm^2$, and then the T-V characteristics were measured. The results are shown in FIGS. 8A and 8B. FIG. 8B is a partially enlarged view of FIG. 8A. It was possible to shift the threshold voltage about 0.55 V to the higher voltage side in the domains to which the ultraviolet rays were irradiated.

Then, the γ property in a state of an angle of direction of 45° and a polar angle of 60° to the tilting direction of the liquid crystal molecules was measured, by setting the maximum driving voltage to 5.4 V and the γ property at the front to 2.4, and changing the synthesis ratio of the transmittance of a domain over which ultraviolet rays had been irradiated and the transmittance of a domain over which ultraviolet rays had not been irradiated. The results are shown in FIGS. 9A to 9D. In FIGS. 9A to 9D, "Reference" shows a property of a conventional MVA cell (with the same cell structure) in which a usual liquid crystal without adding any photopolymerizable compound was enclosed.

In a gray-scale region in which the γ value is less than 1 (the curve being convex upward), difference in color becomes highly visible in general. Accordingly, it is preferable that γ≧1 in a wide range of the gray scale of FIGS. 9A to 9D. Furthermore, since the gray scale region of not less than 128/256 is highly frequently used in display, and color washout tends to be highly visible, the visual quality in the diagonal direction is improved by making the γ value as near to 2.4 as possible.

In FIGS. 9A to 9D, the effect of improvement begins to be observed, when the area ratio of the higher threshold voltage domain increases from A to D, and comes to occupy about 20%. When the higher threshold voltage domain is 40%, the convex part at approximately gray scale 128 in the γ curve disappears. When the higher threshold voltage domain comes up to be 60%, the transmittance value indicates a state which is the nearest to γ=2.4 at gray scale 128 and in its vicinity. Afterwards, the curve gradually changes into a state that has a region with a convex upward at gray scale 160 and its vicinity.

FIGS. 10A to 10D are results obtained by differentiating the γ curves of FIGS. 9A to 9D at each grey scale to acquire γ values in a small range (Δγ). It is understood that, when the higher threshold voltage domain occupies 40%, a large improvement is observed in areas with a point where Δγ value was the smallest at its center, and γ=1 is exceeded in many gray scale values. When the higher threshold voltage domain occupies 60%, not only the region in which γ<1 decreases further, but also γ≧1.5 is obtained in a wide range. However, the γ value decreases in high gray scale regions, and the display quality also decreases when the higher threshold voltage domain is increased more. When the higher threshold voltage domain comes to occupy 80%, the γ value goes down to γ=1 in high gray scale regions.

From the above-described results, it is understood that the divisional ratio of the lower threshold voltage domain to the higher threshold voltage domain is preferably in the range of 4:6 to 6:4 in terms of balancing of the improvement in the transmittance and the γ value. However, if a case in which the improvement of the half-tone viewing angle characteristics is aimed at with a high value being attached to the transmittance, and an opposite case in which it is desired to increase the half-tone viewing angle characteristics as high as possible even though the transmittance may be victimized to a certain extent are considered, it is useful to change the divisional ratio of the lower threshold voltage domain to the higher threshold voltage domain in the range of 2:8 to 8:2.

Example 2

Ultraviolet rays were irradiated at 0.5 mW/$cm^2$ for 10 J/$cm^2$ over the whole surface of a cell prepared in EXAMPLE 1 including the domains which had not been irradiated with ultraviolet rays, and the change of threshold voltage was observed. As a result, the threshold voltage shifted about 0.15 V to the higher threshold voltage side in the domains where only the ultraviolet ray irradiation at 0.5 mW/$cm^2$ had been carried out, while there was no large threshold voltage change observed in the domains where the ultraviolet ray irradiation at 5 mW/cm² had been carried.

Next, a cell similar to one prepared in EXAMPLE 1 was subjected to annealing at 90° C. for 30 minutes, followed by ultraviolet ray irradiation at 0.5 mW/cm² for 10 J/cm² over the whole surface to observe the change of threshold voltage. As a result, the shifting in the threshold voltage was reduced to less than 0.05 V in the domains where only the ultraviolet ray irradiation at 0.5 mW/cm² had been carried out.

Example 3

A cell was formed according to the same conditions as for EXAMPLE 1 except that the added amount of the monomer was 1.8 wt. %.

Figure 11:
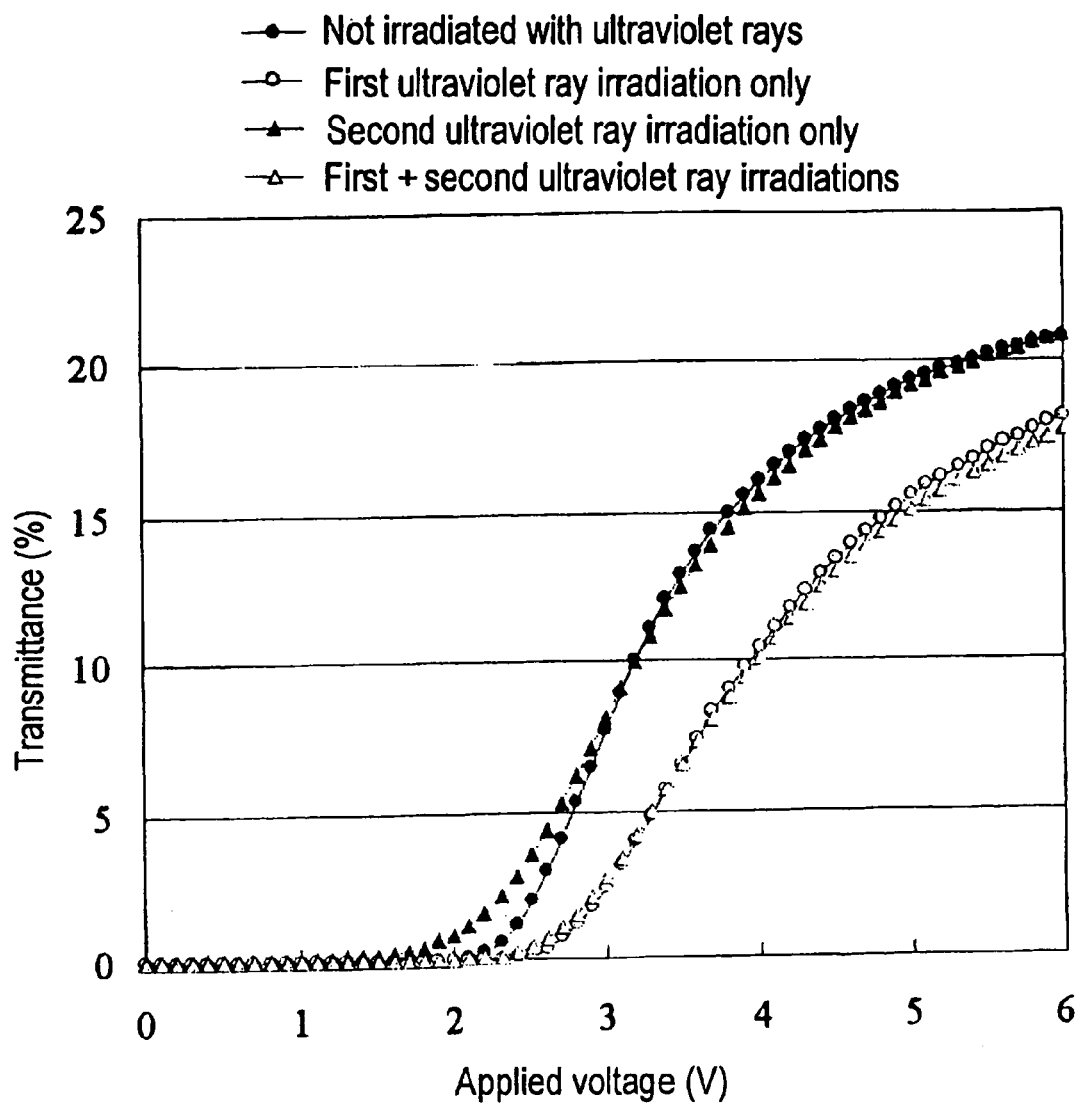
FIG. 11 is a graph showing T-V characteristics of EXAMPLE 3.

Afterwards, additional ultraviolet ray irradiation (secondary irradiation) was carried out at 0.5 mW/cm² for 10 J/cm² over the whole surface including those that had not been irradiated, while a direct current was applied to the liquid crystal layer at 2.5V to observe the change of the threshold voltages. As a result, the threshold voltage could be further decreased at the domains that had been subjected only to the ultraviolet ray irradiation at 0.5 mW/cm² (second irradiation), while no significant change in the threshold voltage value was observed at the domains that had been subjected to the ultraviolet ray irradiation at 5 mW/cm² (primary irradiation), as shown in FIG. 11.

In more detail, it was possible to decrease the threshold voltage of the domains that had been subjected only to the secondary irradiation by 0.25 V, while maintaining the threshold voltage of the domains that had been subjected to the first ultraviolet ray irradiation at 2.7 V, and accordingly, it was possible to widen the threshold voltage difference from 0.40 V to 0.65 V, without increasing the transmittance at the dark state.

Figure 12:
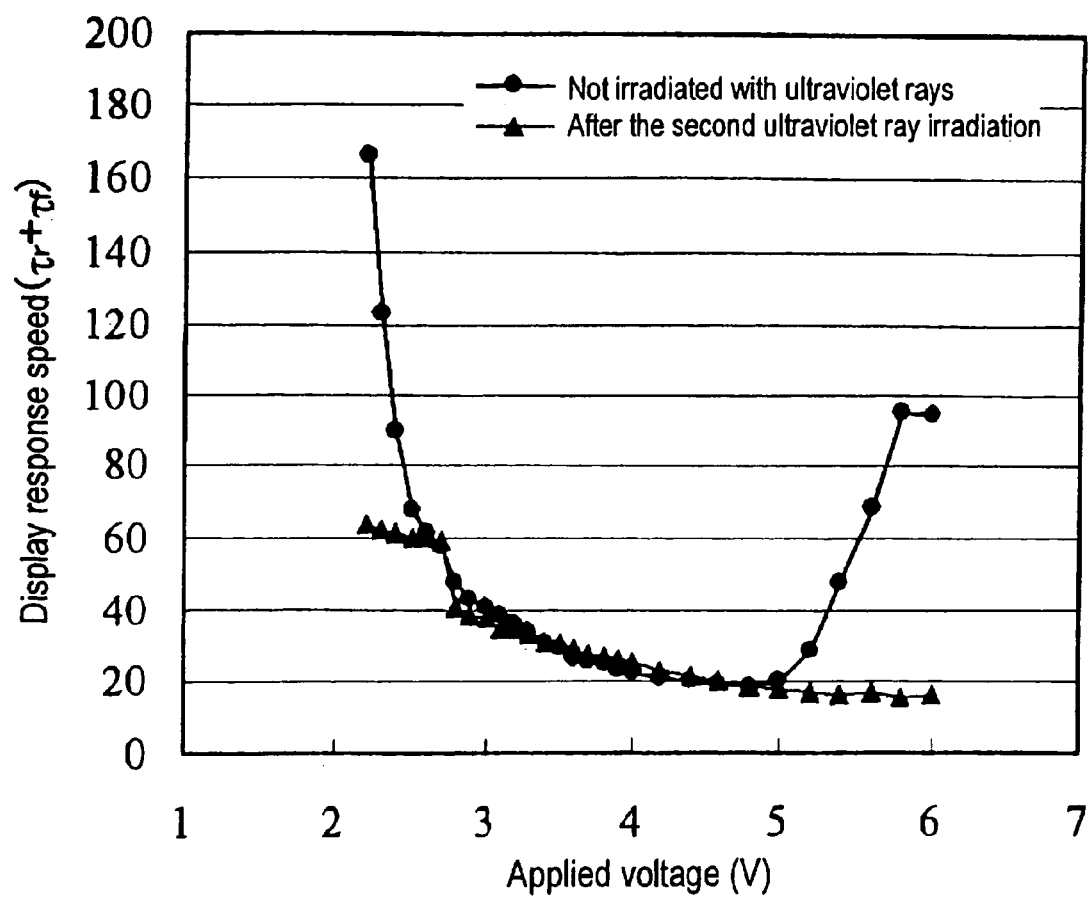
FIG. 12 is a graph showing the relationship between the display response speed and the applied voltage in EXAMPLE 3.

In addition, when the display response speed before and after the secondary irradiation process at the domains where ultraviolet rays had not been irradiated at the primary irradiation was measured, it was possible to greatly improve the display response speed by means of the UV-cured product formed by the secondary irradiation, as shown in FIG. 12.

The display response speed was measured as follows. Polarizers were stuck to the liquid crystal panel in a cross-Nicol arrangement. The value $\tau_r$ as the time in which the transmittance of the panel changed from 10% to 90% when the applied voltage was changed from 0 V to a certain voltage, was measured with a luminance meter. Also, the value $\tau_f$ as the time in which the transmittance of the panel changed from 90% to 10% when the applied voltage was changed from the certain voltage to 0 V, was measured. $\tau_r+\tau_f$ was employed as the display response speed.

Example 4

Two glass substrates with ITO (indium tin oxide) electrodes thereon were used for a cell for evaluation. Using a resist, protrusions in the shape of stripes with a height of 1.5 μm and a width of 10 μm were formed on each electrode with a separation of 35 μm.

Next, vertical alignment control films from JSR Corp. were formed by coating on the whole surfaces of the substrates as the first alignment control layers according to the present invention, the substrates were stuck to each other so that the cell thickness was 4.25 μm, and the protrusions were aligned in parallel with each other and in an equidistantly spaced manner, and then, a liquid crystal composition comprising a liquid crystal and photopolymerizable compound was introduced.

As the photopolymerizable compound, materials with a different number of photoreactable groups and a different number of ring groups in a molecule were prepared. The change in the threshold voltage was observed together with the alignment state, while various added amounts were applied with whichever was the smaller of 3.0 wt. % based on the liquid crystal and the maximum soluble amount being treated as the upper limit. For those that gave a threshold voltage shifting amount (here, "a threshold voltage shifting amount" means the difference from the threshold voltage at the state in which no ultraviolet rays have not been irradiated) of 0.5 V or more, the change in the threshold voltage was also observed by keeping them standing at a constant temperature of 60° C. for 200 hours. A negative type liquid crystal from Merck & Co. was used as the liquid crystal. Besides the photopolymerizable compound, a photoreaction initiator was added in an amount of 2.0 mol % based on the photopolymerizable compound.

Half of the ITO electrode was shaded with a mask, and unpolarized ultraviolet rays were irradiated at an intensity in the range of 3 to 20 mW/cm² for 10 J/cm². The results are shown in TABLE 1. In TABLE 1, RMM-34 is a photopolymerizable compound from Merck & Co. that was a mixture of a compound with one photoreactable group in a molecule and a compound with two photoreactable groups in a molecule.

The number of photoreactable groups and the number of ring groups indicate the numbers in a molecule of a photopolymerizable compound. Regarding the threshold voltage shifting for a higher value, the mark ○ means a threshold voltage shifting amount of not less than 0.5 V, the mark × means a threshold shifting amount of less than 0.3 V, and the mark Δ means a threshold voltage shifting amount of not less than 0.3 V and less than 0.5 V. Regarding the change with time, the mark ○ means that the threshold voltage after standing at a constant temperature of 60° C. for 200 hours was not less than 80% of the original threshold voltage, and the mark × means that the threshold voltage after the standing was not more than 50% of the original threshold voltage. Regarding the light scattering, the mark × means that white bright specks were visually observed in the black display, and the mark ○ means that white bright specks were not visually observed in the black display.

TABLE 1

| Photopolymerizable compound | number of photoreactable groups in a molecule | number of ring groups in a molecule | Shifting toward a higher threshold voltage | Degradation with time | Light scattering |
|---|---|---|---|---|---|
| A | 1 | 0 | X | — | X |
| B | 1 | 1 | Δ | — | ○ |
| C | 1 | 2 | ○ | X | ○ |

TABLE 1-continued

| Photopolymerizable compound | number of photoreactable groups in a molecule | number of ring groups in a molecule | Shifting toward a higher threshold voltage | Degradation with time | Light scattering |
|---|---|---|---|---|---|
| D | 2 | 0 | X | — | X |
| E | 2 | 1 | Δ | — | ○ |
| F | 2 | 2 | ○ | ○ | ○ |
| G | 2 | 3 | Δ | ○ | ○ |
| H | 3 | 0 | Δ | — | X |
| RMM-34 | Mixture | | ○ | ○ | X |

As shown in TABLE 1, those without ring groups tend to show light scattering irrespective of the number of photoreactable groups, and could not give a high threshold voltage difference when no light scattering appeared. Those with one ring group could increase the threshold voltage as much as about 0.3 V without showing light scattering. Those with two ring groups could, irrespective of the number of photoreactive groups, increase the threshold voltage as much as 0.5 V or more without showing light scattering. However, when monofunctional photopolymerizable compounds were employed, there was a phenomenon observed that the threshold voltage was degraded and turned into a state near the original state after the standing at a constant temperature.

To compare, when bifunctional photopolymerizable compounds were employed, the threshold voltage shifting amounts showed little change, and a stable state was obtained. When compounds having three ring groups were employed, the threshold voltage shifting amounts based the added amounts were on the same level as those with compounds having two ring groups. However, there was a limit on the solubility and a shifting amount of about 0.3 V was the upper limit. Regarding RMM-34, too, while it was possible to realize a high threshold voltage, it was not possible to realize a high threshold voltage and an alignment state without light scattering at the same time.

Example 5

Figure 13:
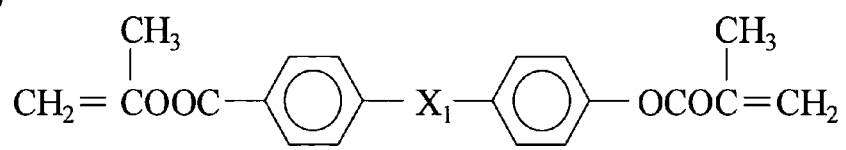
FIG. 13 shows structural formulae of examples of liquid crystals according to the present invention.
Figure 13:
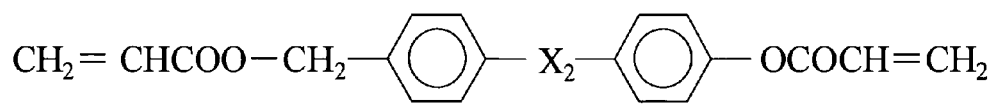
Figure 13:
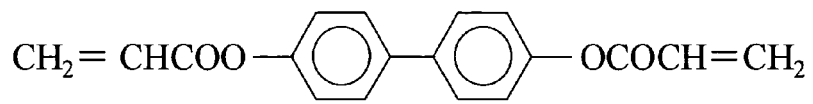

Vertical alignment control films from JSR Corp. were printed on both substrates, and an MVA mode, 17-inch wide (1280×768 dots) TFT liquid crystal panel was prepared by filling a liquid crystal composition comprising a liquid crystal and photopolymerizable compound by a vacuum injection method. A negative type liquid crystal from Merck & Co. was used as the liquid crystal, and the photopolymerizable compounds shown in FIG. 13 were used as the photopolymerizable compound. 2.0 mol % of a photoreaction initiator was added based on the photopolymerizable compounds. Here, $X_1$ and $X_2$ each represent a group binding ring groups.

Figure 14:
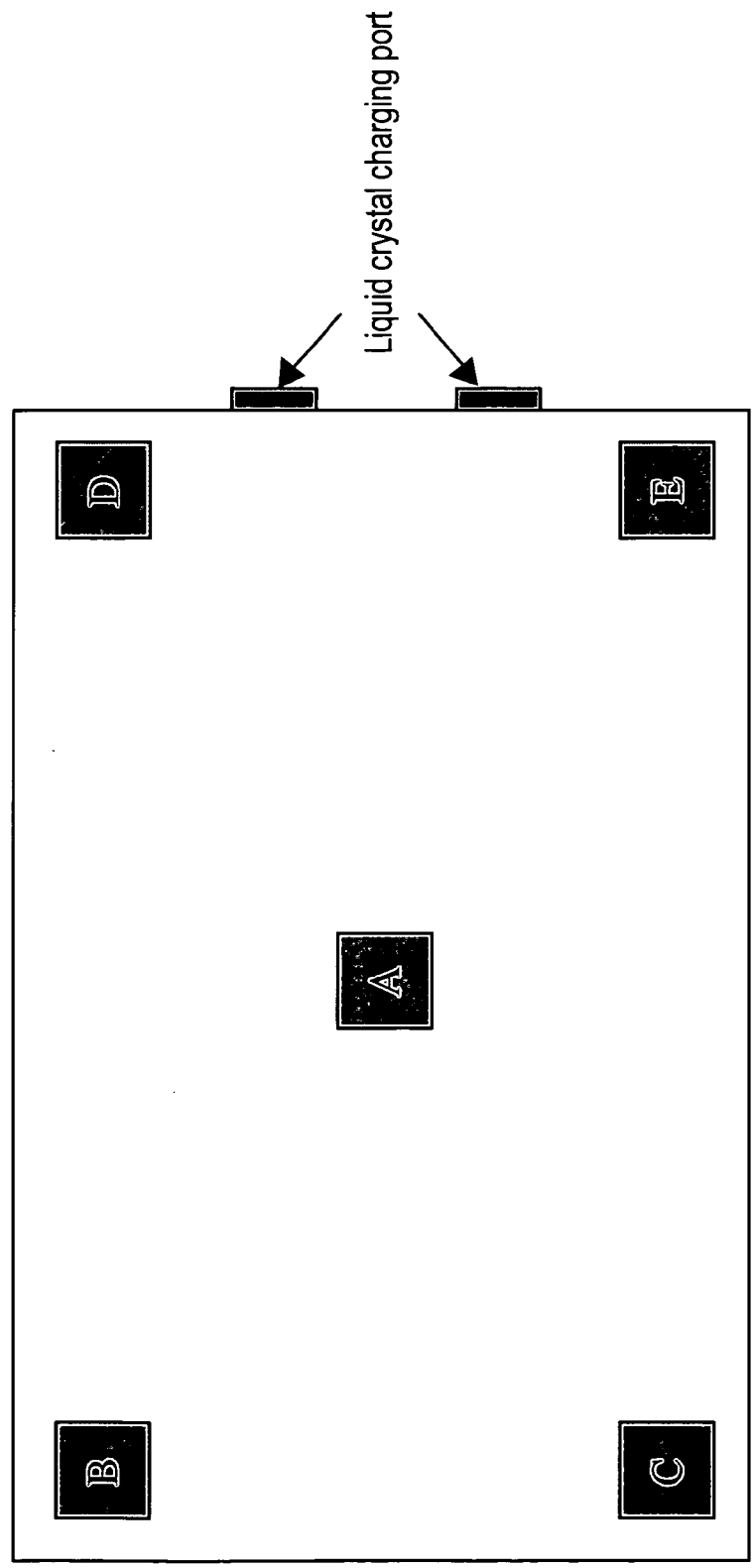
FIG. 14 is a schematic view of a liquid crystal display panel indicating points where the threshold voltage is measured in EXAMPLE 5.

Ultraviolet rays were irradiated at 8 mW/cm² for 14 J/cm², from the TFT substrate side, over the whole surfaces of a liquid crystal panel in which 2.0 wt. % of photopolymerizable compound (I) was added (condition 1), and a liquid crystal panel in which 1.6 wt. % of photopolymerizable compound (I) and 0.4 wt. % of photopolymerizable compound (III) were added (condition 2), respectively, and the threshold voltage shifting amounts were observed at points A to E in FIG. 14.

Figure 15:
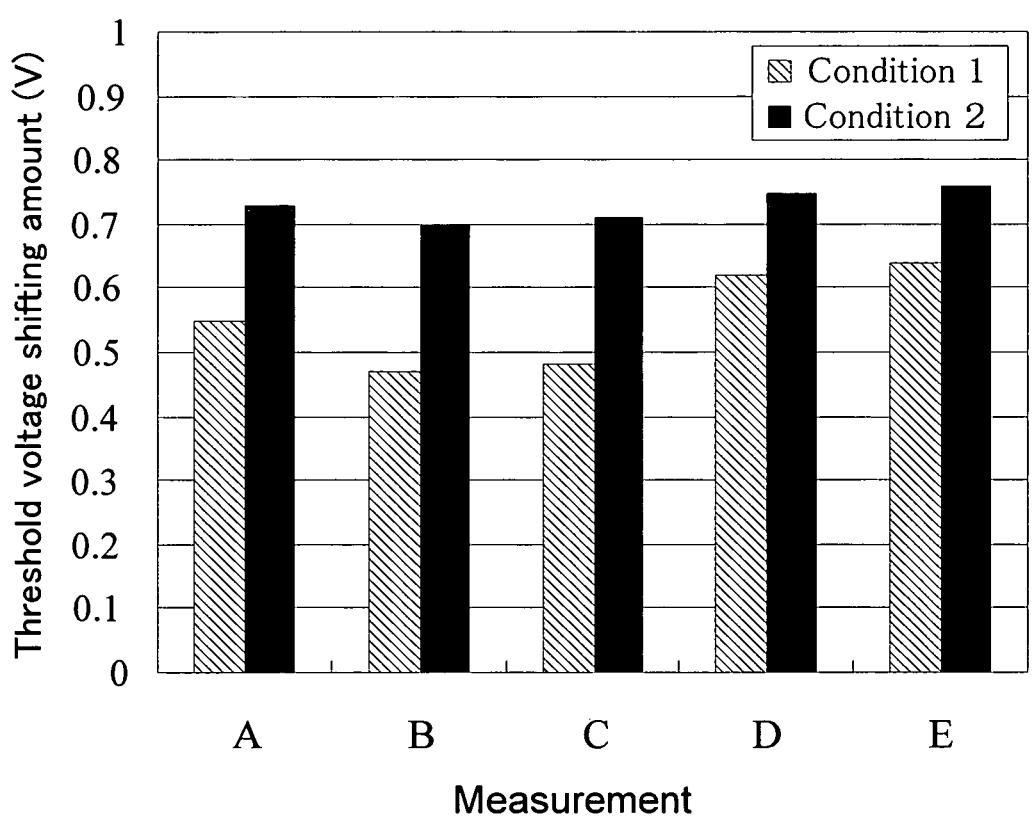
FIG. 15 is a graph showing the threshold voltage shifting amounts at respective measuring points in EXAMPLE 5.

The results are shown in FIG. 15. In any case, a threshold voltage shifting amount as large as would be useful in improving the half-tone viewing angle characteristics was obtained with no problems such as light scattering observed in the alignment. The condition 2 in which photopolymerizable compound (III) with a biphenyl structure was also employed gave a larger threshold voltage shifting amount based on the added amount, providing a uniform value on the whole liquid crystal panel.

Exactly the same tendency was observed when photopolymerizable compound (II) was added instead of photopolymerizable compound (I) in the same experiment.

Example 6

Vertical alignment control films from JSR Corp. were printed on both substrates, and an MVA mode, 17-inch wide (1280×768 dots) TFT liquid crystal panel was prepared by filling a liquid crystal composition comprising a liquid crystal and photopolymerizable compound by a dropping injection method. A negative type liquid crystal from Merck & Co. was used as the liquid crystal, and a mixture of 1.6 wt. % of photopolymerizable compound (I) and 0.4 wt. % of photopolymerizable compound (III) shown in FIG. 13 was used as the photopolymerizable compound. 2.0 mol % of a photoreaction initiator was added based on the photopolymerizable compounds.

Figure 16A:
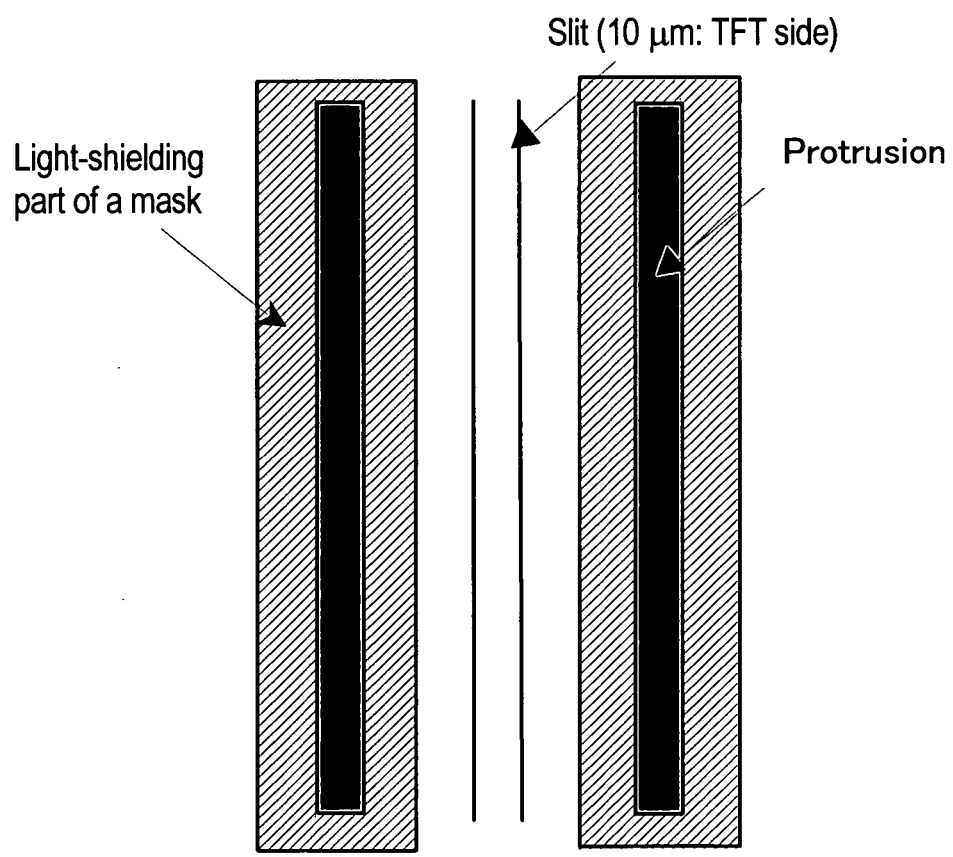
FIG. 16A is a schematic view showing the locations of the light-shielding parts at the time of ultraviolet ray irradiation.
Figure 16B:
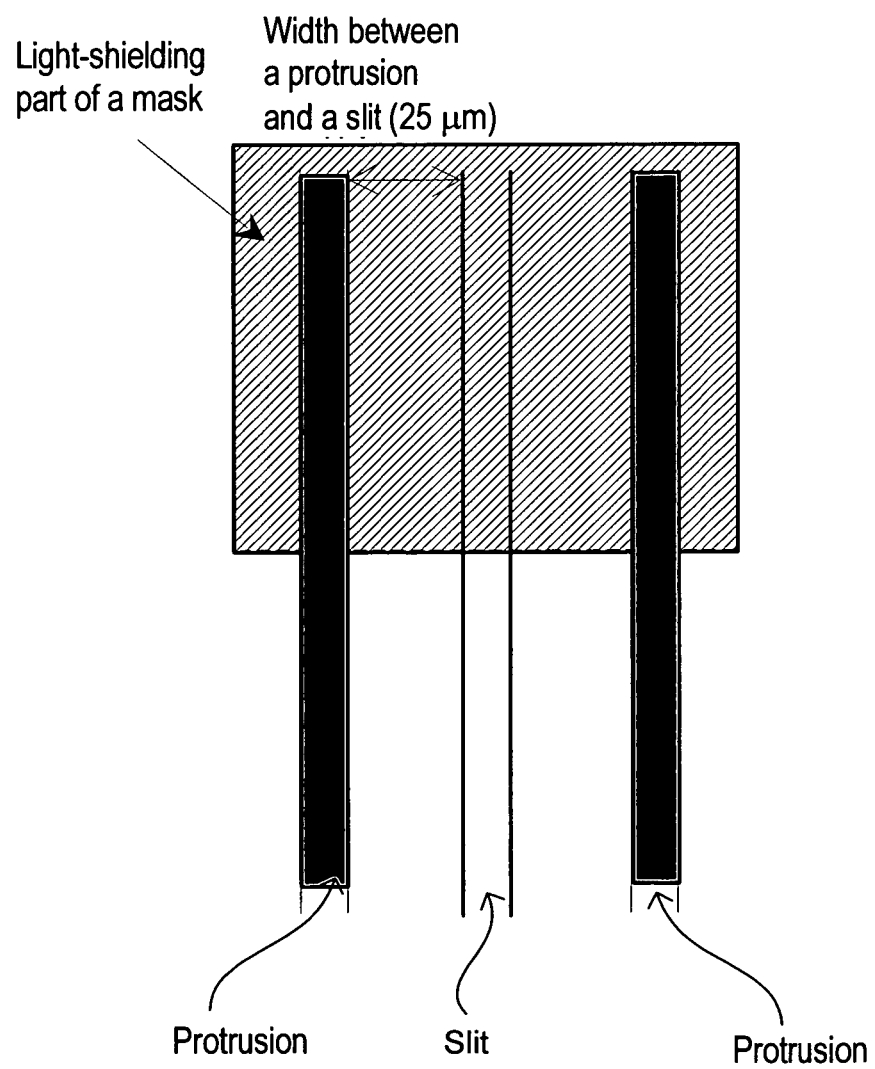
FIG. 16B is another schematic view showing the locations of the light-shielding parts at the time of ultraviolet ray irradiation.

A mask was placed on the TFT substrate side of the liquid crystal panel so that the light-shielding sections were arranged as shown in FIG. 16A or 16B in relation to the protrusions and electrode slits in a pixel. Ultraviolet rays were irradiated over the whole surface through the mask at 8 mW/cm² for 14 J/cm², and the alignment states of the liquid crystal panel after the irradiation were observed.

Figure 16C:
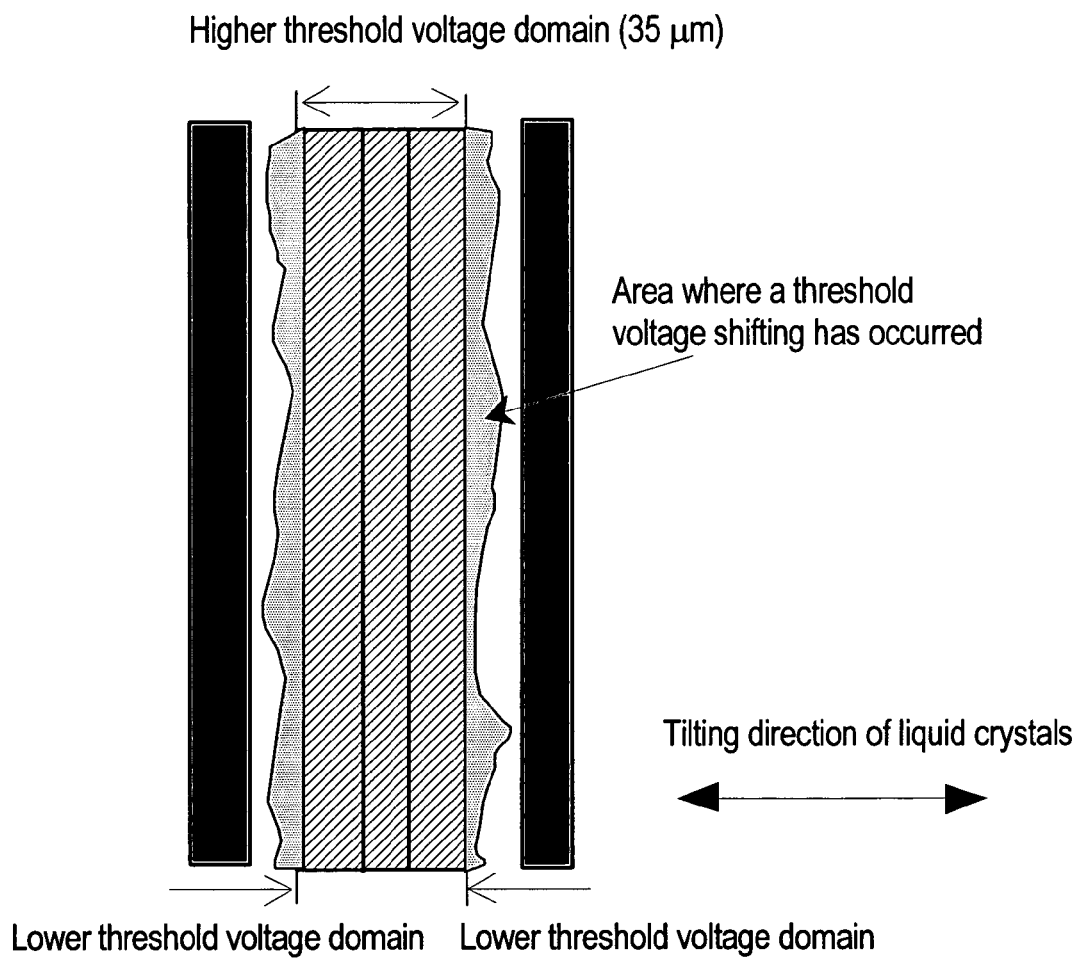
FIG. 16C is a schematic view showing the border between the higher threshold voltage domain and the lower threshold voltage domain generated by ultraviolet ray irradiation.

As a result, when the shielding with the mask was carried out to make the borders between the higher threshold voltage domains and the lower threshold voltage domains in parallel with the protrusions and electrode slits as shown in FIG. 16A (shielding 1), the reaction of the photopolymerizable compounds proceeded in the light-shielded region, and it was visually observed as shown in FIG. 16C that the threshold voltage shifted to a higher voltage side in about 40% of the lower threshold voltage domains, and display irregularities appeared at an applied voltage of 2.4 to 2.5 V.

Figure 16D:
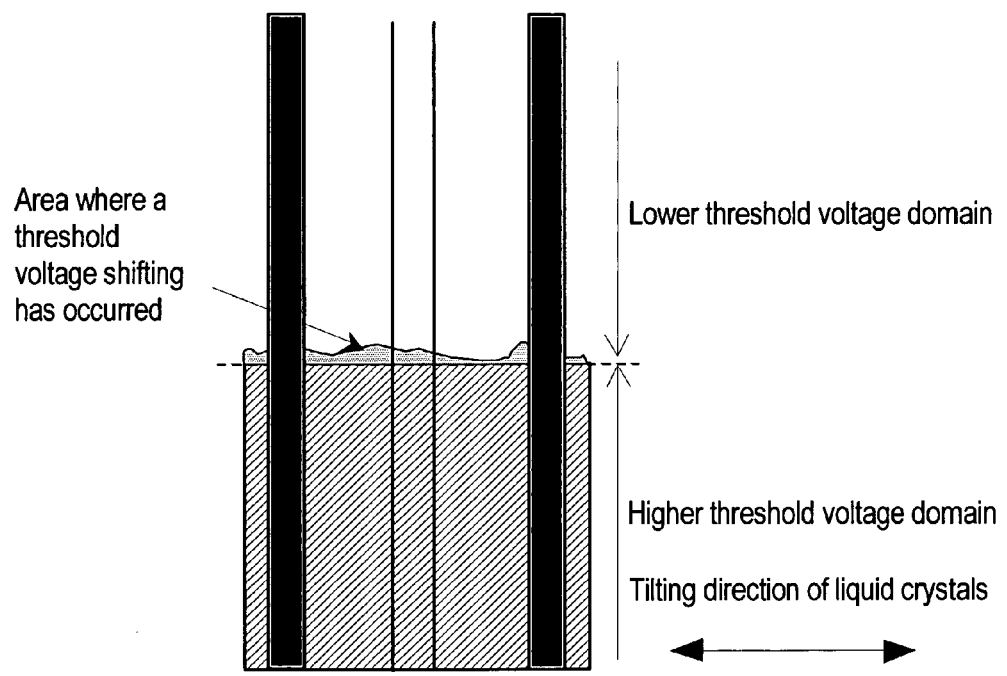
FIG. 16D is another schematic view showing the border between the higher threshold voltage domain and the lower threshold voltage domain generated by ultraviolet ray irradiation.

On the other hand, when the shielding with the mask was carried out to make the borders between the higher threshold voltage domains and the lower threshold voltage domains perpendicular to the protrusions and electrode slits as shown in FIG. 16B (shielding 2), it was observed as shown in FIG. 16D that the threshold voltage shifted to a higher voltage side in some parts of the lower threshold voltage regions in the same way as in shielding 1, but the ratio of the parts to the whole lower thresholds voltage domain was small, and a liquid crystal panel could be realized with uniform display and greatly improved half-tone viewing angle characteristics.

Figure 17:
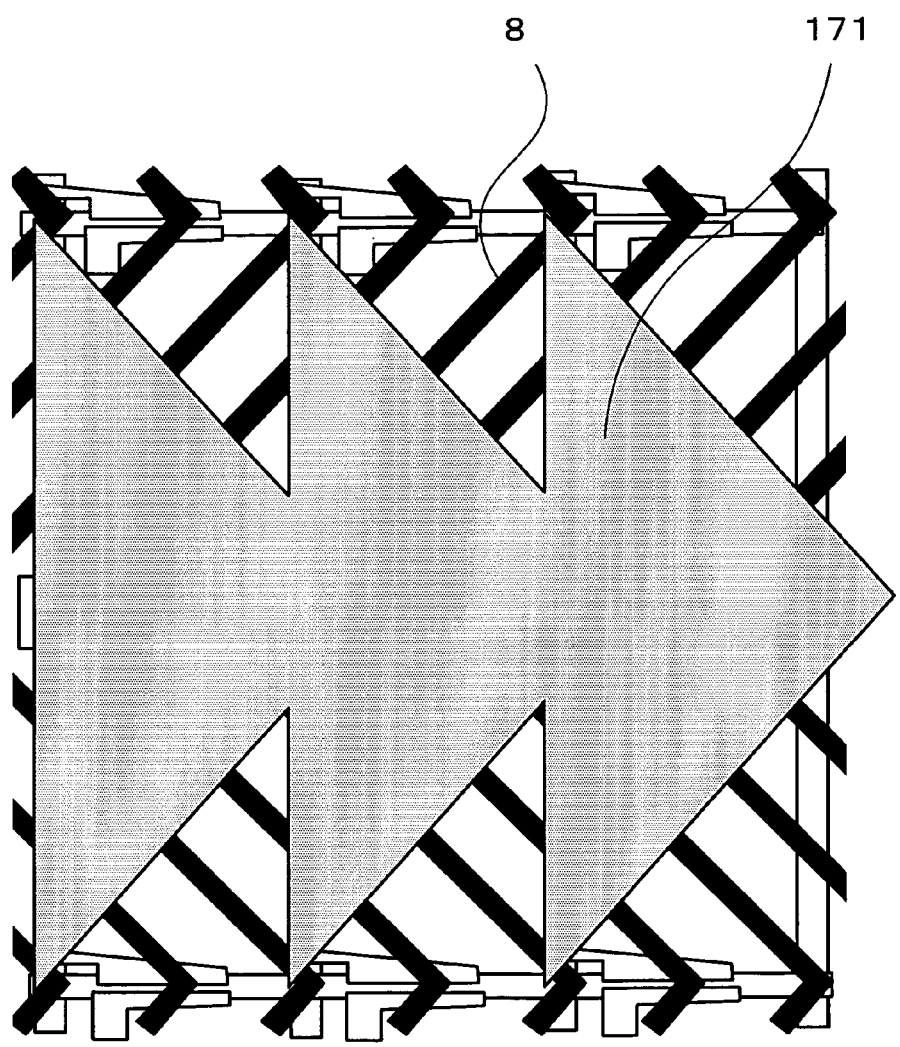
FIG. 17 is a schematic view showing the locational relationship between protrusions in a dogleg shape, and the light-shielding parts of a mask at the time of ultraviolet ray irradiation.

It is to be noted that the borders between the higher threshold voltage domains and the lower threshold voltage domains as shown in FIG. 16B can be easily prepared by using a triangular mask pattern 171 as shown in FIG. 17, when the protrusions or electrode slits are in a dogleg shape as shown in FIG. 7.

What is claimed is:

1. A liquid crystal display device comprising:
   electrodes that are formed on at least one of a pair of substrates, and are used for applying voltage onto liquid crystal molecules;
   a liquid crystal layer formed by sandwiching a liquid crystal composition comprising a liquid crystal and a photopolymerizable compound between the substrates, followed by ultraviolet ray irradiation; and
   a first alignment control layer that is formed on at least one of the substrates between the electrodes and the liquid crystal layer, and which makes the liquid crystal molecules align vertically;
   a second alignment control layer formed directly on, and that completely covers, the first alignment control layer, such that the second alignment control layer is located between the first alignment control layer and the liquid crystal layer, thereby separating the first alignment control layer from the liquid crystal layer, the second alignment control layer being composed of a UV-cured product formed by ultraviolet ray irradiation that is formed so that not less than two domains having different threshold voltages are present in a pixel, and at least one of the domains has a threshold voltage higher than the threshold voltage would be without the second alignment control layer,
   wherein the mutual border between said domains is approximately in parallel with the tilting direction of the liquid crystal molecules.

2. A liquid crystal display device according to claim 1, wherein the mutual border between said domains is installed on protrusions formed on a substrate or slits in an electrode.

3. A liquid crystal display device according to claim 1, wherein the difference between the maximum value and the minimum value of said different threshold voltages is not less than 0.3 V.

4. A liquid crystal display device according to claim 3, wherein two domains having said different threshold voltages are formed in a pixel, and the divisional ratio corresponding to an area of the domain having the lower threshold voltage versus an area of the domain having the higher threshold voltage in a pixel is in the range of 2:8 to 8:2.

5. A liquid crystal display device according to claim 1, wherein said photopolymerizable compound has a ring structure.

6. A liquid crystal display device according to claim 5, wherein said photopolymerizable compound comprises a bifunctional photopolymerizable compound represented by the following formula (1),

α-Y-A-X—B—Z-α    (1)

(wherein A and B are, independently from each other, a ring group; α's are, independently from each other, an acrylate group or a methacrylate group; and X, Y and Z are, independently from each other, a group or direct bond to bind the groups).

7. A liquid crystal display device according to claim 6, wherein said photopolymerizable compound comprises two types: a bifunctional photopolymerizable compound according to formula (1) wherein X is a direct bond, and a bifunctional photopolymerizable compound according to formula (1) wherein X is not a direct bond.

8. A liquid crystal display device according to claim 6 or 7, wherein, in formula (1), Y and Z are, independently from each other, represented by the following formula (2),

—(CH$_2$)$_a$—    (2)

(wherein a is 0 or 1).

9. A liquid crystal display device according to claim 1, wherein the added amount of said photopolymerizable compound is not less than 1.0 wt. % and not more than 3.0 wt. % in said liquid crystal composition.

10. A liquid crystal display device according to claim 1, wherein any retardation value (Δn·d) of said domains is in the range of 350 nm ±70 nm.

11. A liquid crystal display device according to claim 1, wherein not less than two domains having different liquid crystal layer thicknesses are formed in a pixel.

12. A liquid crystal display device according to claim 1, wherein the pretilt angle of the liquid crystal molecules in the liquid crystal display device is not less than 88°.

13. A liquid crystal display device according to claim 1, wherein the pretilt angle in the domain having the highest threshold voltage is about 90°.

14. A liquid crystal display device according to claim 1, wherein said liquid crystal molecules have a structure in which they are tilted while the tilting directions are regulated by protrusions formed on a substrate or slits in an electrode when a voltage is applied.

15. The liquid crystal display device according to claim 1, wherein:
   the first alignment control layer and the second alignment control layer are each only formed on one substrate of the pair of substrates; and
   the liquid crystal layer is located between the second alignment control layer and the other substrate of the pair of substrates.

16. The liquid crystal display device according to claim 1, wherein:
   the first alignment control layer is formed on both substrates of the pair of substrates;
   the second alignment control layer is only formed on one substrate of the pair of substrates; and
   the liquid crystal layer contacts the second alignment control layer on one substrate of the pair of substrates and the other side the first alignment control layer on the other substrate of the pair of substrates.

17. A liquid crystal display device comprising:
   electrodes that are formed on at least one of a pair of substrates, and are used for applying voltage onto liquid crystal molecules;
   a liquid crystal layer formed by sandwiching a liquid crystal composition comprising a liquid crystal and a photopolymerizable compound between the substrates, followed by ultraviolet ray irradiation;
   a first alignment control layer that is formed on at least one of the substrates between the electrodes and the liquid crystal layer, and makes the liquid crystal molecules align vertically;
   a second alignment control layer composed of a UV-cured product formed by the ultraviolet ray irradiation that is formed directly on, and completely covers., the first alignment control layer, such that the second alignment control layer is located between the first alignment control layer and the liquid crystal layer, thereby separating the first alignment control layer from the liquid crystal layer, wherein not less than two domains having different threshold voltages are present in a pixel, and at least one of the domains has a threshold voltage higher than the threshold voltage would be without the second alignment control layer; and wherein the mutual border between said domains is installed on protrusions formed on a substrate or slits in an electrode.

18. The liquid crystal display device according to claim 17, wherein:

the first alignment control layer and the second alignment control layer are each only formed on one substrate of the pair of substrates; and the liquid crystal layer is located between the second alignment control layer and the other substrate of the pair of substrates.

19. The liquid crystal display device according to claim 17, wherein:

the first alignment control layer is formed on both substrates of the pair of substrates;

the second alignment control layer is only formed on one substrate of the pair of substrates; and the liquid crystal layer contacts the second alignment control layer on one substrate of the pair of substrates and the first alignment control layer on the other substrate of the pair of substrates.

20. A liquid crystal display device comprising:

electrodes that are formed on at least one of a pair of substrates, and are used for applying voltage onto liquid crystal molecules;

a liquid crystal layer formed by sandwiching a liquid crystal composition comprising a liquid crystal and a photopolymerizable compound between the substrates, followed by ultraviolet ray irradiation; and a first alignment control layer associated with each of the substrates, such that one of said first alignment control layers is formed between each substrate and the liquid crystal layer, whereby each first alignment control layer makes the liquid crystal molecules align vertically;

a second alignment control layer formed on, and to completely cover, each of the first alignment control layers, thereby separating the first alignment control layers from the liquid crystal layer, said second alignment control layers being composed of a UV-cured product formed by ultraviolet ray irradiation that is formed so that not less than two domains having different threshold voltages are present in a pixel, and at least one of the domains has a threshold voltage higher than the threshold voltage would be without the second alignment control layer, wherein the mutual border between said domains is approximately in parallel with the tilting direction of the liquid crystal molecules.

21. A liquid crystal display device comprising:

electrodes that are formed on at least one of a pair of substrates, and are used for applying voltage onto liquid crystal molecules;

a liquid crystal layer formed by sandwiching a liquid crystal composition comprising a liquid crystal and a photopolymerizable compound between the substrates, followed by ultraviolet ray irradiation; and a first alignment control layer associated with each of the substrates, such that one of said first alignment control layers is formed between each substrate and the liquid crystal layer, whereby each first alignment control layer makes the liquid crystal molecules align vertically;

a second alignment control layer formed on each of the first alignment control layers, said second alignment control layers being composed of a UV-cured product formed by ultraviolet ray irradiation that is formed so that not less than two domains having different threshold voltages are present in a pixel, and at least one of the domains has a threshold voltage higher than the threshold voltage would be without the second alignment control layer, wherein the mutual border between said domains is approximately in parallel with the tilting direction of the liquid crystal molecules, and wherein the second alignment control layers are separated from each other by the liquid crystal layer.

* * * * *